US012640849B2

(12) United States Patent
Kim et al.

(10) Patent No.: US 12,640,849 B2
(45) Date of Patent: May 26, 2026

(54) METHOD AND DEVICE FOR PDSCH TRANSMISSION/RECEPTION IN A WIRELESS COMMUNICATION SYSTEM THAT SUPPORTS MULTI-TRANSMISSION RECEPTION POINT

(71) Applicant: LG ELECTRONICS INC., Seoul (KR)

(72) Inventors: Hyungtae Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 805 days.

(21) Appl. No.: 17/916,735

(22) PCT Filed: Apr. 13, 2021

(86) PCT No.: PCT/KR2021/004644
§ 371 (c)(1),
(2) Date: Oct. 3, 2022

(87) PCT Pub. No.: WO2021/210889
PCT Pub. Date: Oct. 21, 2021

(65) Prior Publication Data
US 2023/0155736 A1 May 18, 2023

(30) Foreign Application Priority Data
Apr. 17, 2020 (KR) ........................ 10-2020-0046512

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0044* (2013.01); *H04W 72/1273* (2013.01); *H04W 72/23* (2023.01)

(58) Field of Classification Search
CPC .. H04W 72/231; H04W 72/232; H04L 5/0044
See application file for complete search history.

(56) References Cited

U.S. PATENT DOCUMENTS

2019/0306878 A1    10/2019   Zhang et al.
2019/0349180 A1*   11/2019   Lu ........................ H04L 27/2607
(Continued)

FOREIGN PATENT DOCUMENTS

CN           110536451 A      12/2019
KR    10-2019-0104985 A1      9/2019

OTHER PUBLICATIONS

ETSI, "TS 138 213 V15.6.0", Jul. 2019, pp. 1-110 (Year: 2019).*
(Continued)

*Primary Examiner* — Salvador E Rivas
(74) *Attorney, Agent, or Firm* — BRYAN CAVE LEIGHTON PAISNER LLP

(57) ABSTRACT

Disclosed are a method and a device for PDSCH transmission or reception in a wireless communication system. According to an embodiment of the present disclosure, a method for transmitting hybrid-automatic repeat and request (HARQ)-acknowledgement (ACK) information may comprise the steps of: receiving, from a base station, downlink control information (DCI) for scheduling of a physical downlink shared channel (PDSCH) in a physical downlink control channel (PDCCH); receiving the PDSCH from the base station; and transmitting an HARQ-ACK codebook including HARQ-ACK information for the PDSCH to the base station. The PDCCH may be repeatedly transmitted in a plurality of monitoring occasions (MOs), and a parameter related to the HARQ-ACK codebook may be determined on
(Continued)

the basis of the most advanced MO among the plurality of MOs.

13 Claims, 16 Drawing Sheets

(51) Int. Cl.
　　*H04W 72/1273* 　　　(2023.01)
　　*H04W 72/23* 　　　　(2023.01)

(56) References Cited

U.S. PATENT DOCUMENTS

| | | | | |
|---|---|---|---|---|
| 2021/0391955 | A1* | 12/2021 | He | H04L 5/0053 |
| 2022/0240228 | A1* | 7/2022 | Matsumura | H04L 1/1861 |
| 2022/0264340 | A1* | 8/2022 | Gao | H04L 5/0055 |
| 2022/0329386 | A1* | 10/2022 | Ye | H04L 5/001 |
| 2023/0163886 | A1* | 5/2023 | Matsumura | H04L 1/1896 |
| | | | | 370/329 |
| 2023/0171040 | A1* | 6/2023 | Gao | H04L 5/0044 |
| | | | | 370/329 |

OTHER PUBLICATIONS

NTT Docomo, Inc, "Enhancements on multi-TRP/panel transmission", R1-1911184, 3GPP TSG RAN WG1 #98bis, Chongqing, China, Oct. 14-20, 2019.

CAICT, "Potential enhancements to PDCCH for URLLC", R1-1901129, 3GPP TSG RAN WG1 Ad-Hoc Meeting 1901, Taipei, Jan. 21-25, 2019.

R1-2001269, 3GPP TSG RAN WG1 Meeting #100-e, Feb. 24-Mar. 6, 2020, Agenda Item: 7.2.2.2.3, Source: Huawei, Title: Feature lead summary#1 on NR-U phase 2 email discussion 100e-NR-unlic-NRU-HARQandULscheduling-01 (enhance Type-2 HARQ-ACK codebook), Document for: Discussion and Decision (32 pages).

R1-2000199, 3GPP TSG RAN WG1 Meeting #100-e, Feb. 24-Mar. 6, 2020, Agenda Item: 7.2.2.2.3, Source: Huawei, HiSilicon, Title: Corrections on HARQ-ACK feedback, Document for: Discussion and Decision (7 pages).

R1-2001000, 3GPP TSG RAN WG1 Meeting #100, e-Meeting, Feb. 24-Mar. 6, 2020, Agenda Item: 7.2.2.2.3, Source: Google Inc., Title: Remaining issues on NR-U HARQ procedures, Document for: Discussion and Decision (9 pages).

R1-2001191, 3GPP TSG RAN WG1 Meeting #100-e, Feb. 24-Mar. 6, 2020, Agenda Item: 7.2.2.2.3, Source: Huawei, Title: Feature lead summary#2 on NR-U HARQ and multi-PUSCH scheduling, Document for: Discussion and Decision (27 pages).

NTT Docomo, Inc. "Enhancements on multi-TRP/panel transmission," 3GPP TSG RAN WG1 #98, R1-1909201, 36 pages, Aug. 2019.

China Telecom, "Discussion on Multi-TRP/Panel Transmission enhancements," 3GPP TSG RAN WG1 #98bis, R1-1911235, 10 pages, Oct. 2019.

Qualcomm Incorporated, "Summary of NR-U agreements till RAN1 #99," 3GPP TSG RAN WG1 Meeting #99 R1-1913599, 40 pages, Nov. 2019.

* cited by examiner

FIG.6

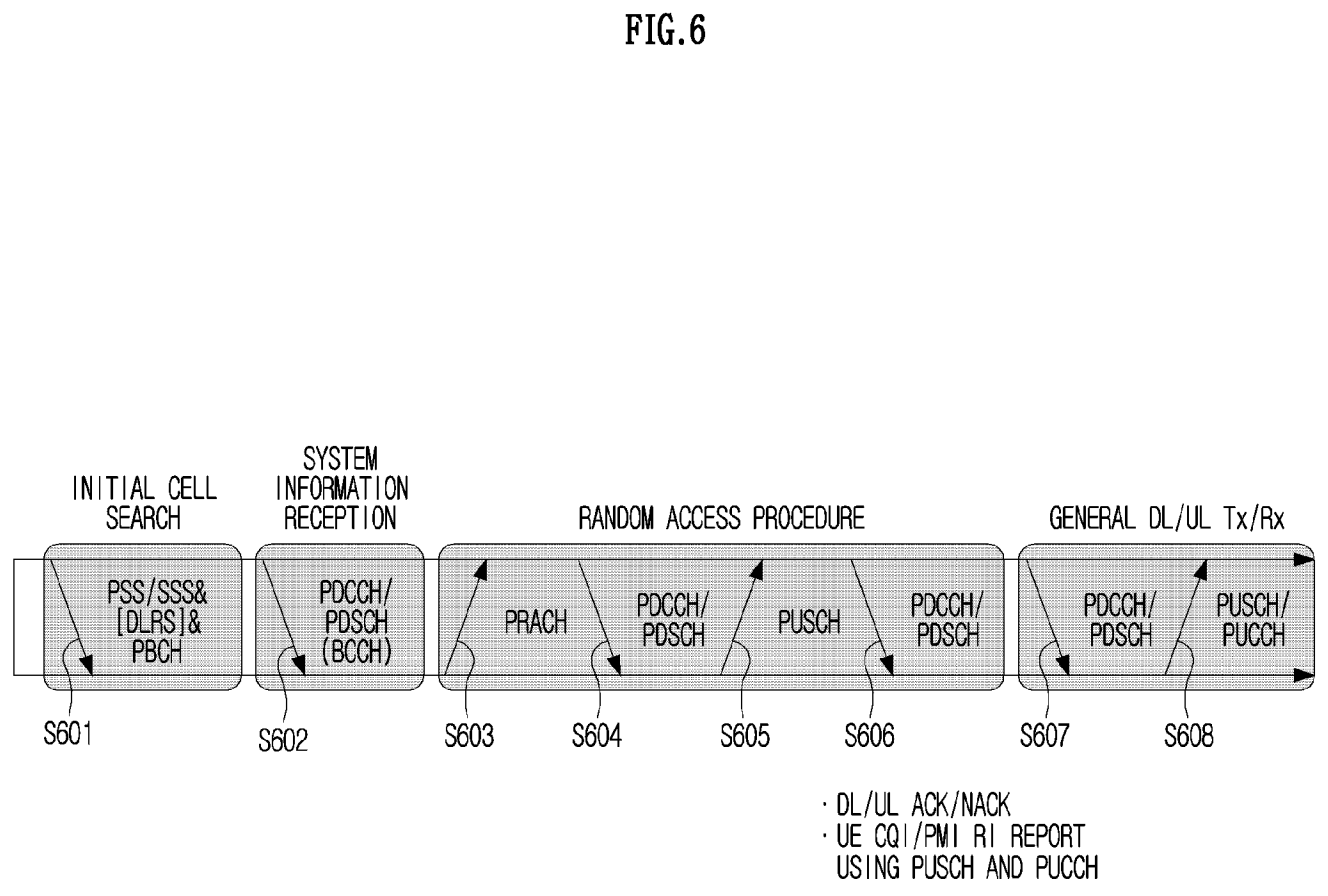

INITIAL CELL SEARCH

SYSTEM INFORMATION RECEPTION

RANDOM ACCESS PROCEDURE

GENERAL DL/UL Tx/Rx

PSS/SSS& [DLRS]& PBCH — S601

PDCCH/ PDSCH (BCCH) — S602

PRACH — S603

PDCCH/ PDSCH — S604

PUSCH — S605

PDCCH/ PDSCH — S606

PDCCH/ PDSCH — S607

PUSCH/ PUCCH — S608

· DL/UL ACK/NACK
· UE CQI/PMI RI REPORT
  USING PUSCH AND PUCCH (a)

(b)

(a)

(b)

METHOD AND DEVICE FOR PDSCH TRANSMISSION/RECEPTION IN A WIRELESS COMMUNICATION SYSTEM THAT SUPPORTS MULTI-TRANSMISSION RECEPTION POINT

CROSS-REFERENCE TO RELATED APPLICATIONS

This application is a National Stage Filing Under 25 U.S.C. 371 of International Application No. PCT/KR2021/004644, filed on Apr. 13, 2021, which claims the benefit of Korean Application No. 10-2020-0046512, filed on Apr. 17, 2020, the contents of which are all hereby incorporated by reference herein in their entirety.

TECHNICAL FIELD

The present disclosure relates to a wireless communication system, and in more detail, relates to a method and an apparatus of transmitting and receiving a PDSCH (physical downlink shared channel) in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving a PDSCH (physical downlink shared channel) in a wireless communication system which supports multi-TRPs (multi-transmission reception point).

In addition, an additional technical object of the present disclosure is to provide a method and an apparatus of transmitting and receiving HARQ (Hybrid-Automatic Repeat and request)-ACK (Acknowledgement) information on a PDSCH.

In addition, an additional technical problem of the present disclosure is to provide a method and an apparatus of transmitting and receiving DCI (downlink control information) for PDSCH transmission and reception.

The technical objects to be achieved by the present disclosure are not limited to the above-described technical objects, and other technical objects which are not described herein will be clearly understood by those skilled in the pertinent art from the following description.

Technical Solution

A method of transmitting HARQ (Hybrid-Automatic Repeat and request)-ACK (Acknowledgement) information according to an aspect of the present disclosure may include receiving, from a base station, downlink control information (DCI) scheduling a PDSCH (physical downlink shared channel) on a PDCCH (physical downlink control channel); receiving, from the base station, the PDSCH; and transmitting, to the base station, a HARQ-ACK codebook including HARQ-ACK information for the PDSCH. The PDCCH may be repetitively transmitted in a plurality of monitoring occasions (MOs) and a parameter related to the HARQ-ACK codebook may be determined based on the earliest MO among the plurality of MOs.

A method of receiving HARQ (Hybrid-Automatic Repeat and request)-ACK (Acknowledgement) information in a wireless communication system according to an additional aspect of the present disclosure may include transmitting, to a terminal, downlink control information (DCI) scheduling a PDSCH (physical downlink shared channel) on a PDCCH (physical downlink control channel); transmitting, to the terminal, the PDSCH; and receiving, from the terminal, a HARQ-ACK codebook including HARQ-ACK information for the PDSCH. The PDCCH may be repetitively transmitted in a plurality of monitoring occasions (MOs) and a parameter related to the HARQ-ACK codebook may be determined based on the earliest MO among the plurality of MOs.

Advantageous Effects

According to an embodiment of the present disclosure, transmission and reception of a PDSCH, transmission and reception of HARQ-ACK information and transmission and reception of DCI which are effective by multi-TRPs (transmission reception point) can be supported.

In addition, according to an embodiment of the present disclosure, as a PDSCH and DCI are transmitted and received based on multi-TRPs, reliability and robustness for PDSCH and DCI transmission and reception can be improved.

In addition, according to an embodiment of the present disclosure, when a plurality of HARQ-ACK information are multiplexed in a HARQ-ACK codebook, ambiguity of an operation for transmission and reception of HARQ-ACK information cannot occur although DCI which is repetitively transmitted among multiple DCI corresponding to a HARQ-ACK codebook is included.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

BEST MODE

Figure 1:
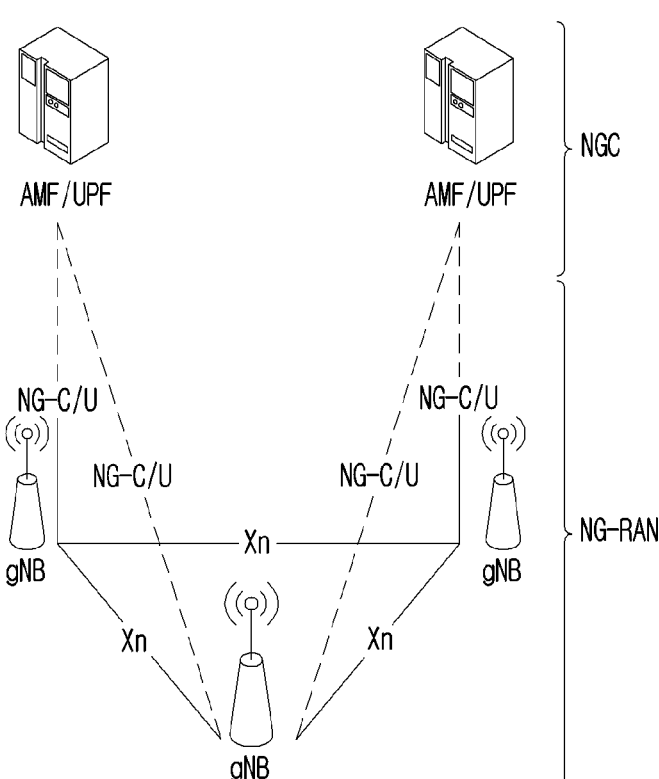
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
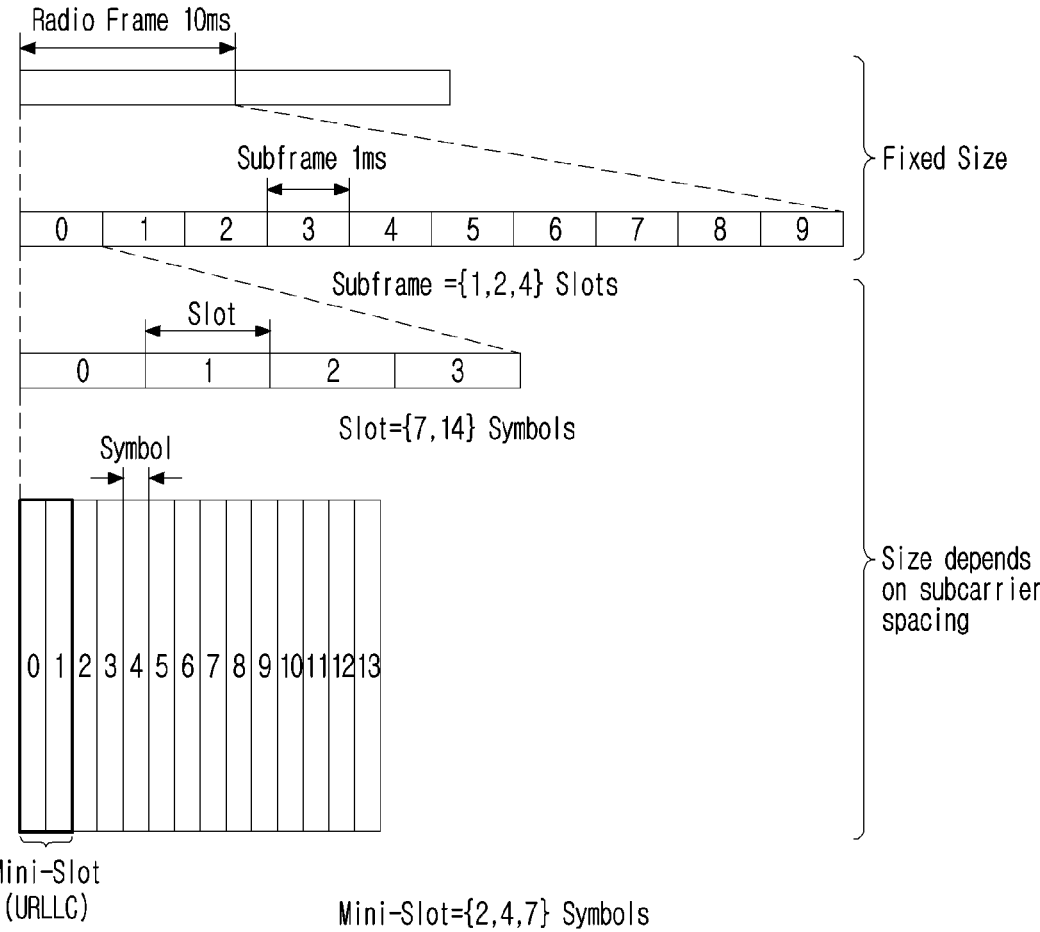
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
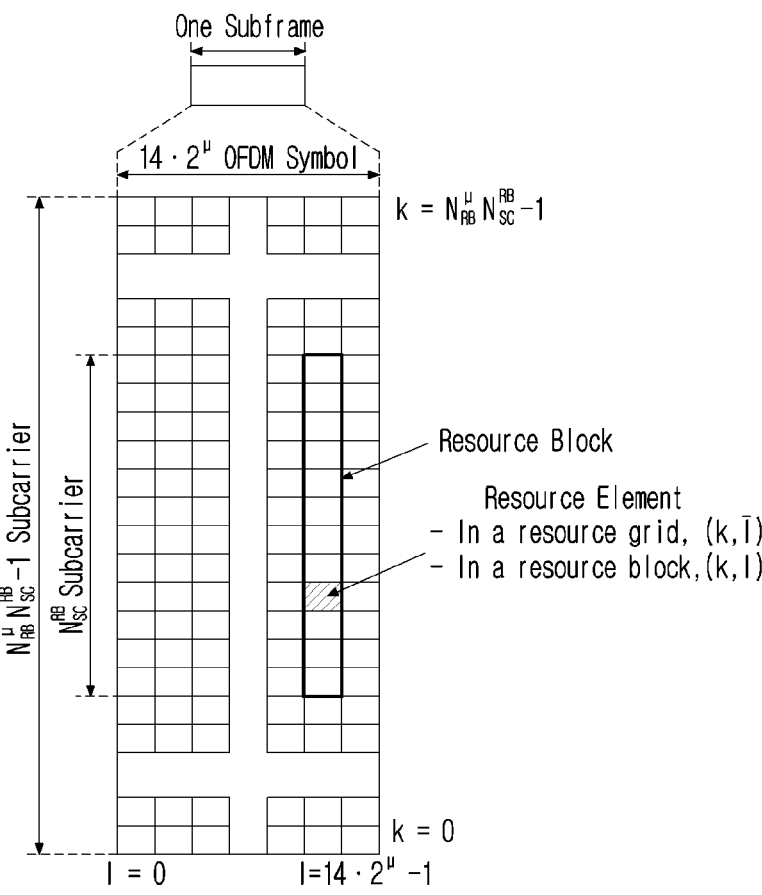
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for $\mu$ and an antenna port p is referred to as a resource element and is uniquely identified by an index pair (k,l'). Here, k=0, . . . , $N_{RB}^\mu N_{sc}^{RB}-1$ is an index in a frequency domain and l'=0, $2^\mu N_{symb}^{(\mu)}-1$ refers to a position of a symbol in a subframe. When referring to a resource element in a slot, an index pair (k,l) is used. Here, l= 0, . . . , $N_{symb}^\mu-1$. A resource element (k,l') for p and an antenna port p corresponds to a complex value, $a_{k,l'}{}^{(p,\mu)}$. When there is no risk of confusion or when a specific antenna port or numerology is not specified, indexes p and p may be dropped, whereupon a complex value may be $a_{k,l'}{}^{(p)}$ or $a_{k,l'}$. In addition, a resource block (RB) is defined as $N_{sc}{}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}{}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}{}^{size,\mu}-1$ a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu}$$

$N_{BWP,i}{}^{start,\mu}$ is a common resource block that a BWP starts relatively to common resource block 0.

Figure 4:
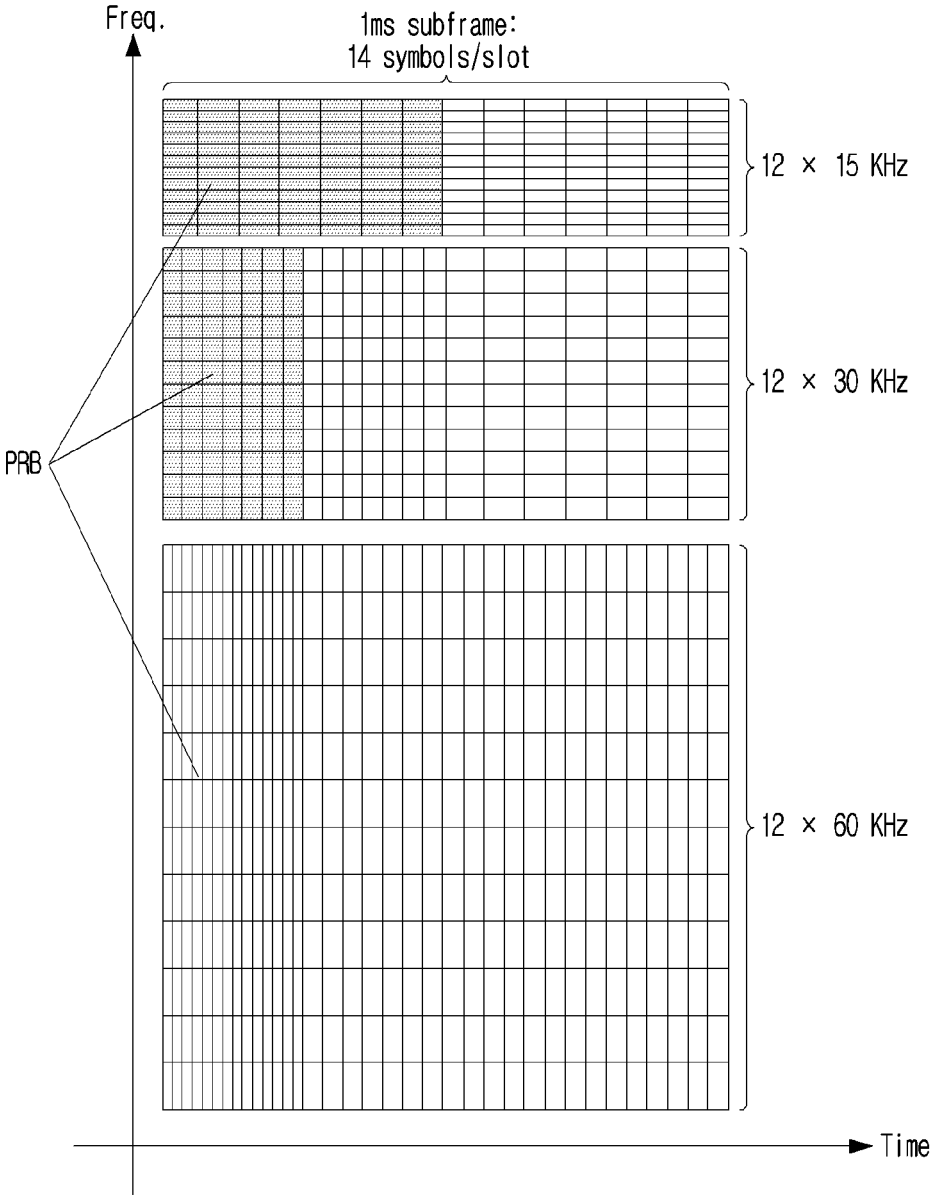
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
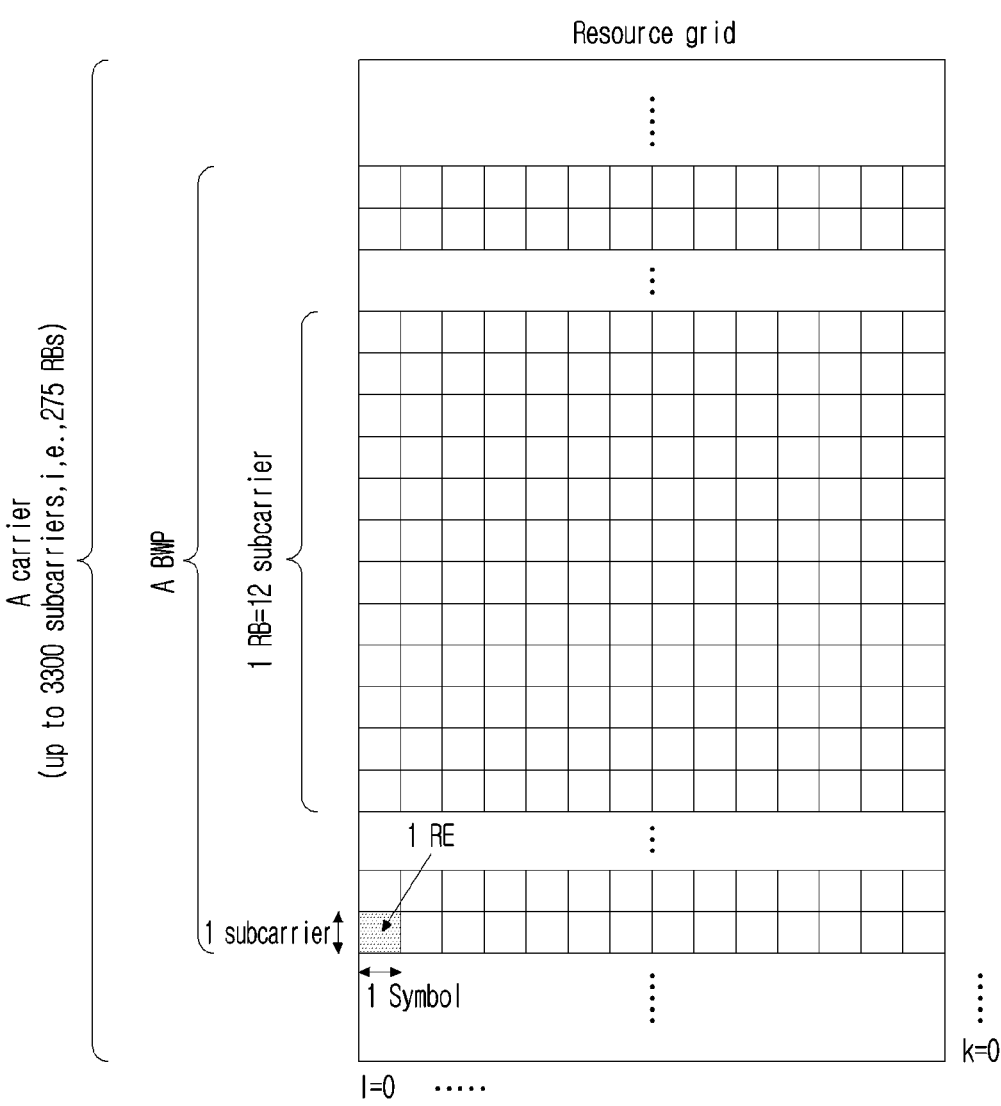
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check)

scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPS

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/ indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, ControlResourceSet information element (IE), a higher layer parameter, is used to configure a time/frequency CORESET (control resource set). In an example, the CORESET may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/CORESET-related TCI information, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
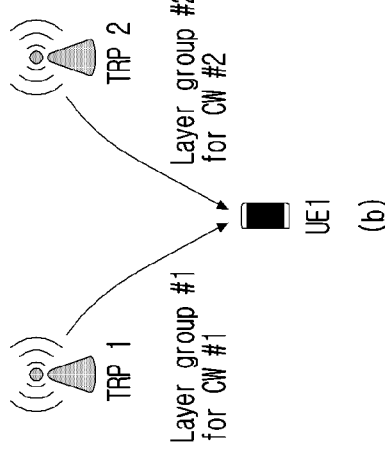
FIG. 7 illustrates a multi-TRP transmission method in a wireless communication system to which the present disclosure may be applied.
Figure 7:
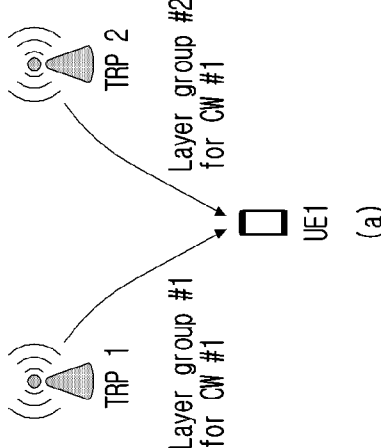

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRPs scheduled by at least one DCI may be performed as follows:

i) Scheme 1 (SDM): n (n is a natural number) TCI states in a single slot in overlapping time and frequency resource allocation Scheme 1a: Each transmission occasion is one layer or a set of layers of the same TB and each layer or layer set is associated with a set of one TCI and one DMRS port(s). A single codeword having one RV (redundancy version) is used for all layers or layer sets. With respect to a UE, different coded bits are mapped to different layers or layer sets by a specific mapping rule.

Scheme 1b: Each transmission occasion is one layer or a set of layers of the same TB and each layer or layer set is associated with a set of one TCI and one DMRS port(s). A single codeword having one RV is used for each spatial layer or layer set. RVs corresponding to each spatial layer or layer set may be the same or different.

Scheme 1c: Each transmission occasion is one layer of the same TB having one DMRS port associated with multiple TCI state indexes or one layer of the same TB having multiple DMRS ports associated with multiple TCI indexes one by one.

For the above-described scheme 1a and 1c, the same MCS is applied to all layers or layer sets.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) are associated with all non-overlapping frequency resource allocation.

Scheme 2a: A single codeword having one RV is used across whole resource allocation. From a viewpoint of UE, common RB mapping (layer mapping of a codeword) is applied across all resource allocation.

Scheme 2b: A single codeword having one RV is used for each non-overlapping frequency resource allocation. RVs corresponding to each non-overlapping frequency resource allocation may be the same or different.

For Scheme 2a, the same MCS is applied to all non-overlapping frequency resource allocation.

iii) Scheme 3 (TDM): n (n is a natural number) TCI states in a single slot in non-overlapping time resource allocation. Each transmission occasion of a TB has one TCI and one RV by time granularity of a mini-slot. All transmission occasion(s) in a slot use a common MCS as the same single or multiple DMRS port(s). A RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) use a common MCS as the same single or multiple DMRS port(s) across K slots. A RV/TCI state may be the same or different among transmission occasions.

A Method for Supporting Multi-TRP (M-TRP:multi-TRP) Transmission and Reception

For repetition transmission of the same TB (transport block) in MTRP-URLLC, transmission and reception may be respectively performed by a multiplexing method of SDM/FDM/TDM according to which is a resource region which is repetitively transmitted among a different layer/a different frequency/a different time. In addition, repetition transmission of the same TB may be performed by using two or more resource regions of SDM/FDM/TDM to get a higher diversity gain.

In the present disclosure, when the same PDCCH is repetitively/partitively transmitted based on MTRP transmission, a method of determining a reception occasion of DCI which is transmitted through a corresponding PDCCH and a method of configuring HARQ-ACK information/a HARQ-ACK-related parameter are proposed. In addition, a method of differently configuring a TCI state configuration corresponding to each codepoint in a TCI field of DCI is proposed by considering MTRP/STRP (single TRP) transmission.

Hereinafter, in methods proposed in the present disclosure, DL MTRP-URLLC means that multiple TRPs transmit the same data/DCI by using a different layer/time/frequency resource. For example, TRP 1 transmits the same data/DCI in resource 1 and TRP 2 transmits the same data/DCI in resource 2. A UE configured with a DL MTRP-URLLC transmission method receives the same data/DCI by using a different layer/time/frequency resource. Here, a UE is indicated from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 are indicated. A UE may achieve high reliability because it receives the same data/DCI through resource 1 and resource 2. Such DL MTRP URLLC may be applied to a PDSCH/a PDCCH.

Conversely, UL MTRP-URLLC means that multiple TRPs receive the same data/DCI from a UE by using a different layer/time/frequency resource. For example, after TRP 1 receives the same data/DCI from a UE in resource 1 and TRP 2 receives the same data/DCI from a UE in resource 2, reception data/UCI is shared through a backhaul link connected between TRPs. A UE configured with a UL MTRP-URLLC transmission method transmits the same data/UCI by using a different layer/time/frequency resource.

Here, a UE is indicated from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 are indicated. Such UL MTRP URLLC may be applied to a PUSCH/a PUCCH.

In addition, hereinafter, in methods proposed in the present disclosure, when a specific TCI state (or TCI) is used (/mapped) in receiving data/DCI/UCI for any frequency/time/space resource, it means as follows. For a DL, it may mean that a channel is estimated from a DMRS by using a QCL type and a QCL RS indicated by a corresponding TCI state in a corresponding frequency/time/space resource and data/DCI is received/demodulated with an estimated channel. For a UL, it may mean that a DMRS and data/UCI are transmitted/modulated by using a Tx beam and/or Tx power indicated by a corresponding TCI state in that frequency/time/space resource.

The UL TCI state includes Tx beam or Tx power information of a UE, and spatial relation information, etc. instead of a TCI state may be configured to a UE through other parameter. An UL TCI state may be directly indicated to UL grant DCI or may mean spatial relation information of an SRS resource indicated by an SRS resource indicator (SRI) field of UL grant DCI. Alternatively, it may mean an open loop (OL) Tx power control parameter connected to a value indicated by an SRI field of UL grant DCI (e.g., j: an index for open loop parameter Po and alpha (up to 32 parameter value sets per cell), q_d: an index of a DL RS resource for PL (pathloss) measurement (up to 4 measurement per cell), 1: a closed loop power control process index (up to 2 processes per cell)).

On the other hand, MTRP-eMBB means that multiple TRPS transmit different data by using a different layer/time/frequency. A UE configured with a MTRP-eMBB transmission method receives an indication on multiple TCI states through DCI and assumes that data received by using a QCL RS of each TCI state is different data.

In addition, a UE may recognize whether of MTRP URLLC transmission/reception or MTRP eMBB transmission/reception by separately classifying RNTI for MTRP-URLLC and RNTI for MTRP-eMBB and using them. In other words, when CRC masking of DCI is performed by using RNTI for URLLC, a UE is considered as URLLC transmission and when CRC masking of DCI is performed by using RNTI for eMBB, a UE is considered as eMBB transmission. Alternatively, a base station may configure MTRP URLLC transmission/reception or may configure MTRP eMBB transmission/reception to a UE through other new signaling.

In a description of the present disclosure, a proposed method is applied by assuming cooperative transmission/reception between 2 TRPs for convenience of a description, but a method proposed in the present disclosure may be also extended and applied in 3 or more multi-TRP environments and in addition, it may be also extended and applied in multi-panel environments. A different TRP may be recognized as a different TCI state to a UE, and when a UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (repetitively or partitively transmitting the same PDCCH) and some proposals may be also utilized in a situation where MTRP cooperatively transmits a PDSCH or cooperatively receives a PUSCH/a PUCCH.

In addition, in the present disclosure, when a plurality of base stations (i.e., MTRPs) repetitively transmit the same PDCCH, it may mean that the same DCI is transmitted by multiple PDCCH candidates and it means that a plurality of base stations repetitively transmit the same DCI. The same DCI may mean two DCI with the same DCI format/size/payload. Alternatively, although two DCI has a different payload, it may be considered the same DCI when a scheduling result is the same. For example, a TDRA (time domain resource allocation) field of DCI may relatively determine a slot/symbol position of ACK/NACK and a slot/symbol position of data based on a reception occasion of DCI. Here, if DCI received at a n occasion and DCI received at a n+1 occasion inform UE of the same scheduling result, a TDRA field of two DCI is different and consequently, a DCI payload is inevitably different, but it may be considered as the same DCI. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI are scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but some resources that that PDCCH candidate is defined are transmitted by TRP 1 and remaining resources are transmitted by TRP 2. For example, when a PDCCH candidate corresponding to aggregation level m1+m2 is partitively transmitted by TRP 1 and TRP 2, a PDCCH candidate may be divided into PDCCH candidate 1 corresponding to aggregation level m1 and PDCCH candidate 2 corresponding to aggregation level m2. And, TRP 1 transmits PDCCH candidate 1 and TRP 2 transmits PDCCH candidate 2 to a different time/frequency resource. After receiving PDCCH candidate 1 and PDCCH candidate 2, UE generates a PDCCH candidate corresponding to aggregation level m1+m2 and tries DCI decoding.

Here, when the same DCI is partitively transmitted to multiple PDCCH candidates, there may be two implementation methods.

First, it is a method that a DCI payload (control information bits+CRC) is encoded through one channel encoder (e.g., a polar encoder) and coded bits gained thereby are partitively transmitted by two TRPs. In this case, for coded bits transmitted by each TRP, all DCI payloads may be encoded or only some DCI payloads may be encoded. In a second method, a DCI payload (control information bits+CRC) is divided into two (DCI 1 and DCI 2) and is encoded through each channel encoder (e.g., a polar encoder). Subsequently, two TRPs transmit coded bits corresponding to DCI 1 and coded bits corresponding to DCI 2, respectively.

In summary, when a plurality of base stations (MTRPs) partitively/repetitively transmit the same PDCCH across a plurality of MOs, i. it may mean that coded DCI bits which encoded the entire DCI contents of a corresponding PDCCH are repetitively transmitted through each MO (monitoring occasion) per each base station (i.e., STRP), or ii. Alternatively, it may mean that coded DCI bits which encoded the entire DCI contents of a corresponding PDCCH are divided into a plurality of parts and a different part is transmitted through each MO per each base station (i.e., STRP), or iii. Alternatively, it may mean that DCI contents of a corresponding PDCCH are divided into a plurality of parts and a different part is separately encoded per each base station (STRP) and transmitted through each MO.

When a PDCCH is repetitively transmitted or partitively transmitted, it may be understood that a PDCCH is transmitted multiple times across multiple TPs (transmission occasion). Here, a TO means a specific time/frequency resource unit that a PDCCH is transmitted. For example, when a PDCCH is transmitted multiple times across slot 1, 2, 3, 4 (to a specific RB), a TO may mean each slot. Alternatively, when a PDCCH is transmitted multiple times across RB set 1, 2, 3, 4 (in a specific slot), a TO may mean each RB set. Alternatively, when a PDCCH is transmitted multiple times across a different time and frequency, a TO may mean each time/frequency resource. Alternatively, a TCI state used for DMRS channel estimation may be differently configured per TO and a TO that a TCI state is differently configured may be assumed to be transmitted in a different TRP/panel. When a plurality of base stations repetitively or partitively transmit a PDCCH, it means that a PDCCH is transmitted across multiple TOs and a union of TCI states configured at a corresponding TO is configured with two or more TCI states. For example, when a PDCCH is transmitted across TO 1, 2, 3, 4, TCI states 1, 2, 3, 4 may be configured for each of TO 1, 2, 3, 4, which means that TRP i cooperatively transmits a PDCCH at TO i.

In addition, hereinafter, in the present document, when a UE repetitively transmits the same PUSCH so that a plurality of base stations (i.e., MTRP) can receive it, it may mean that the same data is transmitted through multiple PUSCHs. Here, each PUSCH may be transmitted by being optimized to a UL channel of a different TRP. For example, a UE repetitively transmits the same data through PUSCH 1 and 2, PUSCH 1 may be transmitted by using UL TCI state 1 for TRP 1 and link adaptation such as a precoder/MCS, etc. is also transmitted after a value optimized for a channel of TRP 1 is scheduled. PUSCH 2 may be transmitted by using UL TCI state 2 for TRP 2 and link adaptation such as a precoder/MCS, etc. is also transmitted after a value optimized for a channel of TRP 2 is scheduled. Here, PUSCH 1 and 2 which are repetitively transmitted may be transmitted at a different time to be time division multiplexed (TDM), frequency division multiplexed (FDM) or spatial division multiplexed (SDM).

In addition, hereinafter, in the present disclosure, when a UE partitively transmits the same PUSCH so that a plurality of base stations (i.e., MTRP) receive it, one data may be transmitted by one PUSCH, and a UE may transmit a resource allocated to that PUSCH by being partitioned and optimized to a UL channel of a different TRP. For example, when a UE transmits the same data through 10 symbol PUSCHs, a UE transmits, in previous 5 symbols, a PUSCH by using UL TCI state 1 for TRP 1, and also transmit link adaptation such as a precoder/MCS, etc. after a value optimized for a channel of TRP 1 is scheduled. In remaining 5 symbols, a UE transmit a PUSCH may be transmitted by using UL TCI state 2 for TRP 2, and also transmits link adaptation such as a precoder/MCS, etc. after a value optimized for a channel of TRP 2 is scheduled. In the example, transmission for TRP 1 and transmission for TRP 2 are time division multiplexed (TDM) by dividing one PUSCH into time resources, but it may be transmitted by other FDM/SDM method.

Similar to PUSCH transmission, a UE may also repetitively transmit the same PUCCH or may partitively transmit the same PUCCH so that a plurality of base stations (i.e., MTRP) receive a PUCCH.

A proposal of the present disclosure may be extended and applied to a variety of channels such as a PUSCH/a PUCCH/a PDSCH/a PDCCH, etc.

A proposal of the present disclosure may be extended and applied to both a case in which the channel is repetitively transmitted to a different time/frequency/spatial resource and a case in which the channel is partitively transmitted to a different time/frequency/spatial resource.

Figure 8:
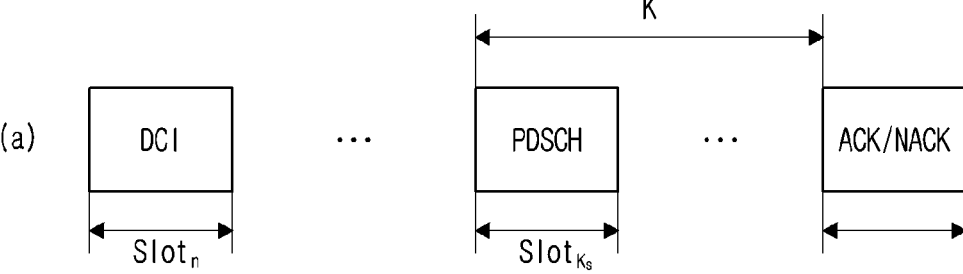
FIG. 8 is a diagram which illustrates a downlink/uplink transmission timing in a wireless communication system to which the present disclosure may be applied.
Figure 8:
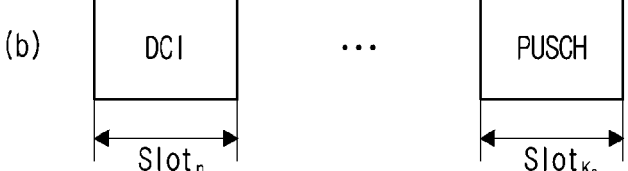

FIG. 8 is a diagram which illustrates a downlink/uplink transmission timing in a wireless communication system to which the present disclosure may be applied.

FIG. 8(a) illustrates a PDSCH and ACK/NACK timing and FIG. 8(b) illustrates a PUSCH timing.

In reference to FIG. 8(a), when UE is scheduled by DCI to receive a PDSCH, m, a value of a field for approving a time domain resource of corresponding DCI (i.e., a 'Time domain resource assignment' field), provides m+1, a row index of a predetermined PDSCH resource allocation-related table. Each row in a PDSCH resource allocation-related table defines slot offset $K_0$, a start and length indicator (SLIV) (or, direct start symbol S and allocation length L) and a PDSCH mapping type assumed in PDSCH reception. When UE receives DCI scheduling a PDSCH in slot n, a $K_0$ value is determined according to a row of a PDSCH resource allocation-related table indicated by m, a value of a 'Time domain resource assignment' field in corresponding DCI, and slot $K_s$ allocated for a PUSCH is determined based on a $K_0$ value and an index (i.e., n) of a slot that DCI is received.

Values of a field for a timing indication of a PDSCH and HARQ feedback in DCI (i.e., a 'PDSCH-to-HARQ_feedback timing indicator' field) are mapped to values of a set of the number of slots provided by a higher layer parameter (e.g., 'dl-DataToUL-ACK', 'dl-DataToUL-ACK-r16'). In other words, a value of the number of specific slots (i.e., K) is determined by a 'PDSCH-to-HARQ_feedback timing indicator' field value in DCI among values of the number of slots provided by a higher layer parameter and a PUCCH slot carrying ACK/NACK for a PDSCH is transmitted in a slot (i.e., slot $K_s$+K) after k from a PDSCH transmission slot.

In reference to FIG. 8(b), when UE is scheduled by DCI to transmit a transport block in a PUSCH, m, a value of a field for approving a time domain resource of corresponding DCI (i.e., a 'Time domain resource assignment' field), provides m+1, a row index of a predetermined PUSCH resource allocation-related table. Each row in a PUSCH resource allocation-related table defines slot offset $K_2$, a start and length indicator (SLIV) (or, direct start symbol S and allocation length L), a PUSCH mapping type assumed for PUSCH transmission and the number of repetitions. When UE receives DCI scheduling a PUSCH in slot n, a $K_2$ value is determined according to a row of a PUSCH resource allocation-related table indicated by m, a value of a 'Time domain resource assignment' field in corresponding DCI, and slot $K_s$ allocated for a PUSCH is determined based on a $K_2$ value and an index (i.e., n) of a slot that DCI is received.

For a HARQ-ACK information bit, when UE detects a DCI format which provides SPS (semi-persistent scheduling) PDSCH release or when UE accurately decodes a transport block, UE generates positive ACK. On the other hand, when UE does not accurately decode a transport block, UE generates negative ACK (NACK: negative acknowledgment). 1, a HARQ-ACK information bit value, represents ACK and 0, a HARQ-ACK information bit value, represents NACK.

When a higher layer parameter for a PDSCH HARQ-ACK codebook (i.e., 'pdsch-HARQ-ACK-Codebook') is semi-statically configured, UE determines type 1 HARQ-ACK codebook. When a higher layer parameter for a PDSCH HARQ-ACK codebook (i.e., 'pdsch-HARQ-ACK-Codebook') is dynamically configured or when a higher layer parameter of release 16 (i.e., 'pdsch-HARQ-ACK-Codebook-r16') is configured, UE determines Type-2 HARQ-ACK codebook. When a higher layer parameter for one feedback of PDSCH HARQ-ACK (i.e., 'pdsch-HARQ-ACK-OneShotFeedback') is configured, UE determines Type-3 HARQ-ACK codebook.

Type-2 HARQ-ACK codebook is described.

UE does not expect that HARQ-ACK information is multiplexed in Type-2 HARQ-ACK codebook in response to detection of a DCI format which does not include a C-DAI (counter-downlink assignment index).

When UE performs detection at a first PDCCH monitoring occasion and receives a first DCI format which includes a PDSCH-HARQ feedback timing indicator field (i.e., 'PDSCH-to-HARQ_feedback timing indicator') providing a non-value from a higher layer parameter, 'dl-DataToUL-ACK-r16', and when UE detects a second DCI format, UE multiplexes corresponding HARQ-ACK in PUCCH or PUSCH transmission in a slot indicated by a value of a PDSCH-to-HARQ_feedback timing indicator field in a second DCI format.

Otherwise, UE does not multiplex corresponding HARQ-ACK information in PUCCH or PUSCH transmission.

Problem 1: When a PDCCH is repetitively transmitted at a different time, a reception occasion of corresponding DCI is unclear. As a result, the existing HARQ-ACK (ACK/NACK)-related indicators (parameters) defined by using a reception occasion of DCI (e.g., a C-DAI (counter-downlink assignment index), T-DAIs (total-DAI), a PRI (PUCCH resource indicator), a CCE (control channel element) index, etc.) may be incorrectly used.

Figure 9:
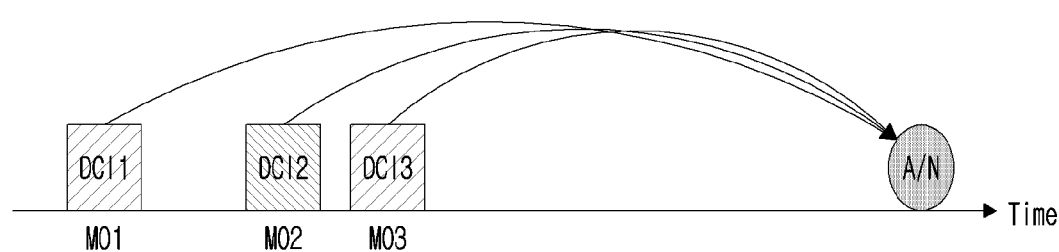
FIG. 9 is a diagram which illustrates generation of a HARQ dynamic codebook in a wireless communication system to which the present disclosure may be applied.

The following FIG. 9 represents how a reception occasion of DCI affects the existing HARQ-ACK (e.g., ACK/NACK) related indicators.

FIG. 9 is a diagram which illustrates generation of a HARQ dynamic codebook in a wireless communication system to which the present disclosure may be applied.

In reference to FIG. 9, for example, a DAI value for generating a (dynamic) ACK/NACK codebook (i.e., a HARQ-ACK codebook) is determined based on a reception occasion of DCI (i.e., a MO (monitoring occasion)). A C-DAI value of DCI received later increases by +1 compared with a C-DAI value of DCI received before and DCI at the same reception occasion indicates the same T-DAI value.

Regarding it, more specifically, for example, Type-2 HARQ-ACK codebook in a PUCCH is described. UE determines monitoring occasions for a PDCCH which carries a DCI format indicating SCell dormancy or scheduling PDSCH reception or PDSCH release in an activated DL BWP of a serving cell. And, UE transmits HARQ-ACK information in the same PUCCH in slot n based on the following.

PDSCH-to-HARQ_feedback timing indicator field values for transmitting a PUCCH carrying HARQ-ACK information in slot n in response to an indication of PDSCH reception, SPS PDSCH release or SCell dormancy Slot offset $K_0$ provided by a time domain resource assignment field, a higher layer parameter for a PDSCH aggregation factor (i.e., 'AggregationFactor' or pdsch-AggregationFactor-r16) or a higher layer parameter for the number of repetitions (i.e., 'repetitionNumber') in a DCI format scheduling PDSCH reception A set of PDCCH monitoring occasions for a DCI format scheduling PDSCH reception or PDSCH release or indicating SCell dormancy are defined as a union of PDCCH monitoring occasions across activated DL BWPs of configured serving cells. PDCCH monitoring occasions are indexed in ascending order of start time of PDCCH monitoring occasions. Cardinality of a set of PDCCH monitoring occasions is defined as M, the total number of PDCCH monitoring occasions.

A value of a C-DAI (counter DAI) field in a DCI format represents an accumulative number of {serving cell, PDCCH monitoring occasion}-pair(s) in an indication of PDSCH reception(s), SPS PDSCH release or SCell dormancy associated with the DCI format which exists to a current serving cell and a current PDCCH monitoring occasion.

First, when UE supports one or more PDSCH reception in a serving cell scheduled from the same PDCCH monitoring occasion, a value of a DAI (counter DAI) field is determined in ascending order of PDSCH reception starting time for—the same {serving cell, PDCCH monitoring occasion}-pair.

Second, a value of a DAI (counter DAI) field is determined in ascending order of a serving cell index.

Third, a value of a DAI (counter DAI) field is determined in ascending order of a PDCCH monitoring occasion index, $m(0 \leq n < M)$.

A value of T-DAIs (total DAI) in a DCI format, if it exists, represents the total number of {serving cell, PDCCH monitoring occasion}-pair(s) in an indication of PDSCH reception(s), SPS PDSCH release or SCell dormancy associated with the DCI format which exists to m, a current PDCCH monitoring occasion, and is updated from a PDCCH monitoring occasion to a PDCCH monitoring occasion.

In addition, a DCI reception occasion is used to determine a PUCCH resource indication (PRI) value configuring a PUCCH resource that a (dynamic/semi-static) ACK/NACK codebook is transmitted. For example, when one ACKNACK codebook is generated for a PDSCH scheduled by DCI 1, 2, 3, 4 respectively, a PUCCH resource which will transmit an ACKNACK codebook is determined according to a PRI of DCI 4 (i.e., last DCI) received last among them.

In addition, when a PUCCH resource that a (dynamic/semi-static) ACKNACK codebook is transmitted is selected in PUCCH set 0, a PUCCH resource is selected based on a CCE index and a PRI of DCI received last.

Regarding it, more specifically, for example, for a first set of PUCCH resources, when RPUCCH, a size of a resource list (i.e., a higher layer parameter, resourceList) is greater than 8, UE determines a PUCCH resource with an index, $r_{PUCCCH}(0 \leq r_{PUCCCH} \leq R_{PUCCCH}-1)$, as in the following Equation 3 when UE provides HARQ-ACK in PUCCH transmission in response to detection of last DCI format 1_0 or DCI format 1_1 in one PDCCH reception among DCI format 1_0 or DCI format 1_1 having a value of a field which indicates the same slot for PUCCH transmission (i.e., a 'PDSCH-to-HARQ_feedback timing indicator' field).

$$r_{PUCCH} = \begin{cases} \left[ \dfrac{n_{CCE,p} \cdot \lceil R_{PUCCH}/8 \rceil}{N_{CCE,p}} \right] + \Delta_{PRI} \cdot \left\lceil \dfrac{R_{PUCCH}}{8} \right\rceil & \text{if } \Delta_{PRI} < R_{PUCCH} \bmod 8 \\[4mm] \left[ \dfrac{n_{CCE,p} \cdot \lfloor R_{PUCCH}/8 \rfloor}{N_{CCE,p}} \right] + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases}$$   [Equation 3]

In Equation 3, $N_{CCE,p}$ is the number of CCEs in CORE-SET p of PDCCH reception for a DCI format. $n_{CCE,p}$ is an index of a first CCE for PDCCH reception. $\Delta_{PRI}$ is a value of a PUCCH resource indicator field in a DCI format. If a DCI format does not include a PUCCH resource indicator field, $\Delta_{PRI}$ is 0.

In the above-described example, it may be seen that ACK/NACK-related indicators (e.g., a C-DAI, T-DAIs, a PRI, a CCE index) may be correctly operated/determined only when a reception order of corresponding DCI is determined when multiple DCI corresponding to the same ACK/NACK codebook (i.e., a HARQ-ACK codebook) is configured.

Figure 10:
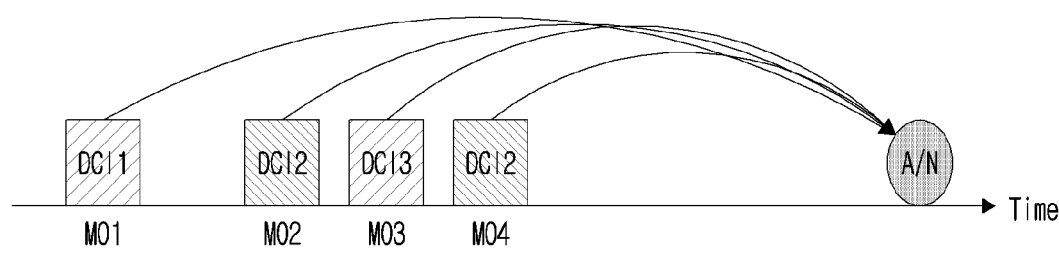
FIGS. 10 and 11 are diagrams which illustrate a generation and reporting operation of a HARQ-ACK codebook in a wireless communication system to which the present disclosure may be applied.

FIG. 10 is a diagram which illustrates a generation and reporting operation of a HARQ-ACK codebook in a wireless communication system to which the present disclosure may be applied.

In FIG. 10, a case which is not CA (carrier aggregation) is illustrated.

In reference to FIG. 10, a case in which DCI 1 is received at MO (monitoring occasion) 1, DCI 2 is received at MO2 and MO4 and DCI 3 is received at MO3 respectively is illustrated. A case in which each of DCI 1, 2, 3 schedules a different PDSCH (a PDSCH is not shown) and HARQ-ACK information (i.e., A/N (ACK/NACK) information) on each PDSCH is generated (i.e., HARQ-ACK for each PDSCH is multiplexed) and reported as one ACK/NACK codebook is illustrated. Here, DCI 1 and 3 are transmitted 1 time, so a DCI reception occasion is clear, but DCI 2 is repetitively transmitted across MO2 and 4, so a reception occasion is unclear. Accordingly, when multiple DCI corresponding to the same ACK/NACK codebook is configured as above, a reception order of corresponding DCI is unclear. As a result, the existing ACK/NACK related indicators (e.g., a C-DAI, a T-DAI, a PRI, a CCE index) may be incorrectly used. For example, when a reception occasion of DCI 2 is configured as MO 2, a reception order of DCI is DCI 1, 2, 3, but when a reception occasion of DCI 2 is configured as MO 4, a reception order of DCI is DCI 1, 3, 2, so interpretation of UE and a base station about ACK/NACK related indicators becomes ambiguous.

Proposal 1: For DCI repetitively transmitted, the first transmission of corresponding DCI may be determined as a reception occasion (i.e., a MO). In other words, a terminal may determine a reception occasion/order of DCI based on the first MO of DCI repetitively transmitted. If it is generalized, when specific DCI of multiple DCI associated with the same HARQ-ACK codebook is repetitively transmitted at a plurality of MOs, for corresponding DCI, a reception occasion/order between multiple DCI associated with the same HARQ-ACK codebook may be determined based on a pre-determined MO position among a plurality of MOs (e.g., the first MO, the last MO, etc.).

For example, a plurality of DCI scheduling a specific PDSCH may be transmitted. Here, a DCI reception order may be determined by assuming/determining a MO associated with first DCI of a plurality of DCI (or, a CCE index, here, an index of a first CCE ($n_{CCE,p}$) for receiving a PDCCH carrying corresponding DCI may be an example of an CCE index) as a reception occasion of the plurality of DCI.

For example, when it is applied to FIG. 10, a reception occasion of DCI 2 corresponds to MO2 (i.e., among MO2 and MO4 that DCI2 is transmitted) and a reception occasion may be determined in an order of DCI 1, 2, 3. And, DCI 1, 2, 3 may be indicated as c-DAI=1, 2, 3, respectively. In addition, as the last DCI is DCI 3 received at MO3, a PUCCH resource which will transmit A/N (i.e., ACK/NACK or HARQ ACK) may be determined according to a CCE index (e.g., an index ($n_{CCE,p}$) of a first CCE for receiving a PDCCH carrying corresponding DCI) and a PRI of DCI 3. If DCI 3 is not transmitted, a PUCCH resource which will transmit A/N is determined according to a CCE index and a PRI of DCI 2, and a CCE index of DCI 2 transmitted at MO 2 may be different from a CCE index of DCI 2 transmitted at MO 4. Also in this case, a PUCCH resource may be determined as a CCE index of DCI 2 transmitted at MO 2, the first transmission occasion.

In addition, multiple DCI may be allowed to be transmitted at one MO. For example, when performing cross-SCS scheduling in MR-DC (multi RAT (radio access technology) dual connectivity), multiple DCI may be allowed to be transmitted at one MO. In this case, the last reception DCI may be determined based on a CCE index on each of multiple DCI (e.g., an index ($n_{CCE,p}$) of a first CCE for receiving a PDCCH carrying corresponding DCI). For example, when DCI 1 and DCI 2 are received from the same serving cell at the same MO (e.g., MO 1) in cross-SCS scheduling, the last reception DCI of DCI 1 and DCI 2 may be determined by comparing a CCE index of DCI 1 with a CCE index of DCI 2. Here, when DCI 3 is transmitted across a plurality of MOs including MO 1, a reception occasion of DCI 3 may be determined as the first MO of a plurality of corresponding MOs. If a reception occasion of DCIS determined as above is MO 1 and DCI 1, 2, 3 are transmitted from the same serving cell, the last reception DCI of DCI 1, 2, 3 may be determined by comparing a CCE index of DCI 1,2,3. For example, DCI with the largest CCE index among a plurality of DCI transmitted at the same MO may be determined as the last DCI. Alternatively, DCI with the smallest CCE index among a plurality of DCI transmitted at the same MO may be determined as the last DCI.

When a UE detects specific DCI through any MO (a specific CCE at a corresponding MO), a MO at the first occasion when any PDCCH candidate that corresponding DCI may be transmitted may be mapped/transmitted (including signal mapping/transmission at a corresponding MO (a corresponding specific CCE at that MO)) may be promised/considered as a reception occasion of corresponding DCI. And, a HARQ-ACK related parameter (e.g., a C-DAI, a T-DAI, a PRI, a CCE index) may be determined based on a MO occasion of the corresponding first occasion. Alternatively, for example, a HARQ-ACK related parameter (e.g., a C-DAI, a T-DAI, a PRI, a CCE index) may be determined based on a MO of the last occasion instead of a MO of the first occasion.

In addition, an operation which determines a reception MO occasion of DCI as above may be similarly applied to a case of determining a base slot applying a $K_0$ value corresponding to a PDCCH-to-PDSCH offset (i.e., a slot corresponding to $K_0$=0) or a case of determining a base slot applying a $K_2$ value corresponding to a PDCCH-to-PUSCH offset (i.e., a slot corresponding to $K_2$=0). For example, for DCI transmitted at a plurality of MOs, a slot that a MO at the above-proposed first occasion exists (e.g., slot i) may be promised as a base slot (i.e., a slot corresponding to $K_0$=0 and/or $K_2$=0). In this case, a PDSCH may be scheduled in slot (i+$K_0$). In addition, a PUSCH may be scheduled in slot (i+$K_2$). Alternatively, for example, for DCI transmitted at a plurality of MOs, a slot that a MO at the above-proposed last occasion exists (e.g., slot i) may be promised as a base slot (i.e., a slot corresponding to $K_0$=0 and/or $K_2$=0). In this case, a PDSCH may be scheduled in slot (i+$K_0$). In addition, a PUSCH may be scheduled in slot (i+$K_2$).

In the above-described example, A/N (ACK/NACK) transmission for a single serving cell is taken as an example for convenience of a description, but it is not limited thereto. When multiple serving cells are configured in a CA (carrier aggregation) situation and total DAIs (t-DAI) as well as a c-DAI are also configured, the proposal may be applied to determine a T-DAI value. In other words, a MO of DCI 2 repetitively transmitted may be determined as MO 2 of MO 2 and 4 (i.e., a reception timing of DCI 2 is determined as MO 2) and a c-DAI and t-DAIs of DCI2 may be calculated with a c-DAI and t-DAI value of DCI of other serving cell transmitted at MO 2. On the other hand, a c-DAI and t-DAIs of DCI of other serving cell transmitted at MO 4 may be calculated by assuming that DCI 2 is not transmitted at MO 4.

Figure 11:
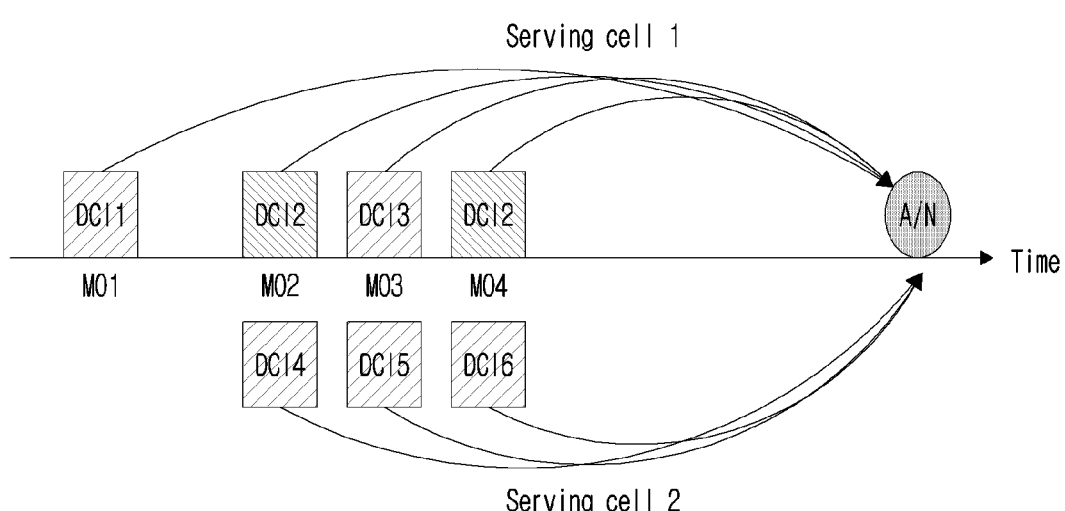

FIG. 11 is a diagram which illustrates a generation and reporting operation of a HARQ-ACK codebook in a wireless communication system to which the present disclosure may be applied.

FIG. 11 illustrates a CA situation that serving cell 1 and 2 are configured to UE. For example, it is assumed that in cell 1, DCI 1, 2, 3 are transmitted at the same occasion as in the FIG. 10 and in cell 2, DCI 4, 5, 6 are transmitted at MO 2,3,4, respectively. Here, DCI 2, 4 are transmitted at MO2, so a DAI value is configured as in the following Table 6. DCI 2, 6 are transmitted at MO 4, but a DAI of DCI 2 is considered at MO 2, so a DAI is calculated by assuming that only DCI 6 is transmitted.

Table 6 illustrates a c-DAI and t-DAI value per DCI according to an example of FIG. 11.

TABLE 6

| | MO | c-DAI | t-DAI |
|---|---|---|---|
| DCI1 | 1 | 1 | 1 |
| DCI2 | 2 | 2 | 3 |
| DCI3 | 3 | 4 | 1 |
| DCI4 | 2 | 3 | 3 |
| DCI5 | 3 | 1 | 1 |
| DCI6 | 4 | 2 | 2 |

In the existing NR system, a DAI value increases in an order that a base station transmits DCI, and when first transmission of DCI which is repetitively transmitted as in proposal 1 is promised as a reception occasion, a base station may still increase a DAI value in an order of transmitting DCI.

Similarly, in the existing NR system, a PRI value is determined as a PRI value of DCI for a PDSCH scheduled last by a base station, and when first transmission of DCI which is repetitively transmitted as in proposal 1 is promised as a reception occasion, a PUCCH resource may be still selected according to a PRI value scheduled last by a base station.

Alternatively, for example, a reception occasion of DCI which is repetitively transmitted may be promised/determined based on a specific MO (e.g., a last MO) of a plurality of MOs of DCI which is repetitively transmitted. In addition, a base station may indicate/configure to UE a specific MO for being determined as a reception occasion of the DCI which is repetitively transmitted among a plurality of MOs of DCI which is repetitively transmitted.

Proposal 2: When MTRPs repetitively/partitively transmit a PDCCH and when a STRP transmits a PDCCH, a codepoint of a TCI field (e.g., a TCI state field) of DCI may be differently defined for each. In other words, according to a case in which MTRPs repetitively/partitively transmit a PDCCH and a case in which a STRP transmits a PDCCH, a TCI state indicated by a value of a TCI state field of DCI may be differently defined.

When MTRPs repetitively/partitively transmit a PDCCH, most (e.g., equal to or greater than half) of codepoints of a TCI field may be defined to indicate multiple TCI states so that a PDSCH scheduled by corresponding DCI will easily support MTRP cooperative transmission. On the other hand, when a STRP transmits a PDCCH, most (e.g., equal to or greater than half) of codepoints of a TCI field may be defined to indicate one TCI state so that a PDSCH scheduled by corresponding DCI will easily support STRP transmission. In other words, when part of TCI states configured by RRC are defined as TCI states for a codepoint of a TCI field (e.g., through a MAC CE (control element) signal), a definition on a codepoint used by DCI transmitted through a MTRP PDCCH (i.e., a TCI state indicated by each codepoint) may be different from a definition on a codepoint used by DCI transmitted through a STRP PDCCH (i.e., a TCI state indicated by each codepoint). In other words, a TCI state composition/configuration may be different according to whether of a STRP/MTRPs for a specific codepoint.

Table 7 represents one example of proposal 2.

TABLE 7

| A TCI field of DCI from a MTRP PDCCH | | A TCI field of DCI from a STRP PDCCH | |
|---|---|---|---|
| 000 | TCI state 1 | 000 | TCI state 1 |
| 001 | TCI state 1, 2 | 001 | TCI state 2 |
| 010 | TCI state 1, 3 | 010 | TCI state 3 |
| 011 | TCI state 1, 4 | 011 | TCI state 4 |
| 100 | TCI state 2, 3 | 100 | TCI state 5 |
| 101 | TCI state 2, 4 | 101 | TCI state 1, 2 |
| 110 | TCI state 3, 4 | 110 | TCI state 2, 3 |
| 111 | TCI state 1, 2, 3 | 111 | TCI state 3, 4 |

In reference to Table 7, even for the same codepoint, a TCI state indicated by each codepoint may be differently defined according to whether of STRP or MTRP.

If the above-mentioned proposal 2 is applied, UE should perform tracking for a QCL RS (reference signal) corresponding to more TCI states, so it is desirable that a terminal reports whether an operation in proposal 2 is supported to a base station as UE capability information. Alternatively, without increasing the number of QCL RSs which should be entirely tracked, a TCI field for a MTRP PDCCH and a TCI field for a STRP PDCCH may be differently defined, respectively.

In addition, to differently define a TCI field for a TRP PDCCH and a TCI field for a STRP PDCCH, respectively, a TCI state pool configured by RRC may be partitively defined. In other words, a TCI state pool for a TRP PDCCH and a TCI state pool for a STRP PDCCH may be independently defined/configured.

Alternatively, a TCI state pool is shared, but a TCI field of a MTRP PDCCH and a TCI field of a STRP PDCCH may be differently defined through different MAC CE signaling.

In addition, for a MTRP-based PDCCH and a STRP-based PDCCH, TCI state information and combination configured per each codepoint of a TCI field in DCI corresponding to each may be independently (e.g., differently) configured between a MTRP-based PDCCH and a STRP-based PDCCH. MAC CE activation signaling for this configuration may be indicated by being classified into activation signaling for a MTRP-based PDCCH and activation signaling for a STRP-based PDCCH.

In addition, with respect to a UE, for a case in which DCI is detected through a MTRP-based PDCCH candidate and a case in which DCI is detected through a STRP-based PDCCH candidate, corresponding UE may operate to differently interpret/apply TCI state information and combination mapped to each codepoint of a TCI field in corresponding DCI according to the configuration. For example, when DCI is detected through a plurality of PDCCH candidates and when a DMRS of each PDCCH candidate is connected to a different TCI state (i.e., when a RS having a QCL relationship with a DMRS of each PDCCH candidate is configured by a different TCI state), a UE may interpret a TCI field on the assumption of a MTRP-based PDCCH. On the other hand, when DCI is detected through a single PDCCH candidate, a UE may interpret a TCI field on the assumption of a STRP-based PDCCH.

In the present disclosure, the above-described proposals (e.g., proposal 1/proposal 2) may select in which proposal a base station will operate (e.g., proposal 1/proposal 2) and indicate/configure it to UE. Alternatively, as implementation complexity of UE may be different according to each proposed operation, UE may report to a base station which proposal may be supported as capability information (e.g., proposal 1 and/or proposal 2) and a base station may perform a corresponding proposed operation (i.e., proposal 1 and/or proposal 2) by considering an operation supported by UE.

In the present disclosure, a proposal is described by using a case in which the same PDCCH (i.e., the same DCI) is repetitively transmitted when a PDCCH is transmitted multiple times as an example, but it is just an example for convenience of a description. In other words, even when the same PDCCH (i.e., the same DCI) is partitively transmitted multiple times, the above-described proposal may be extended and applied.

In the present disclosure, a proposal is mainly described by using an example that a PDCCH is repetitively transmitted two times, but it is just an example for convenience of a description. In other words, even when it is repeated N times (N is a natural number), a proposal may be extended and applied in a way that UE performs decoding one time after receiving all PDCCHs which are repeated N times.

In the present disclosure, it is assumed for convenience of a description that MO 1 and MO 2 are configured for one Search space set, but they may be configured for a different Search space set. In this case, UE may receive a configuration from a base station that corresponding Search space sets are used for repetitive transmission and may apply a proposal.

In the present disclosure, for convenience of a description, an example that a PDCCH is time division multiplexed at a different MO and repetitively transmitted is used, but the above-described proposal may be extended and applied even when a PDCCH is frequency division multiplexed for a different frequency resource (e.g., a RE/a RE group (REG: RE group)/a REG bundle/a CCE or any REG set) and repetitively transmitted. Here, MO 2 and 4 in FIGS. 10 to 11 may be replaced with CORESET 1 (a DL RS of TP 1 is configured as a QCL RS) and CORESET 2 (a DL RS of TP 2 is configured as a QCL RS), respectively. Alternatively, MO 2 and 4 in FIGS. 10 to 11 may be replaced with frequency resource set 1 used by TP 1 for PDCCH transmission and frequency resource set 2 used by TP 2 for PDCCH transmission, respectively.

In addition, in the present disclosure, a one-time transmission PDCCH means a PDCCH transmission method of the existing Rel-16 NR system.

In addition, proposals described in the present disclosure (e.g., proposal 1/proposal 2) may be independently operated or may be combined each other and applied.

Figure 12:
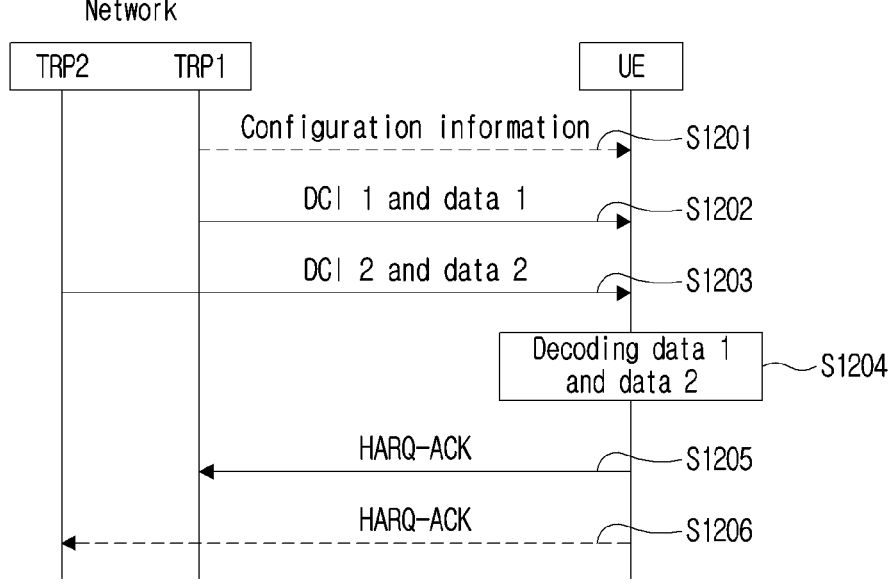
FIGS. 12 and 13 illustrate a signaling procedure between a network and a terminal for a method of transmitting and receiving downlink data according to an embodiment of the present disclosure.
Figure 13:
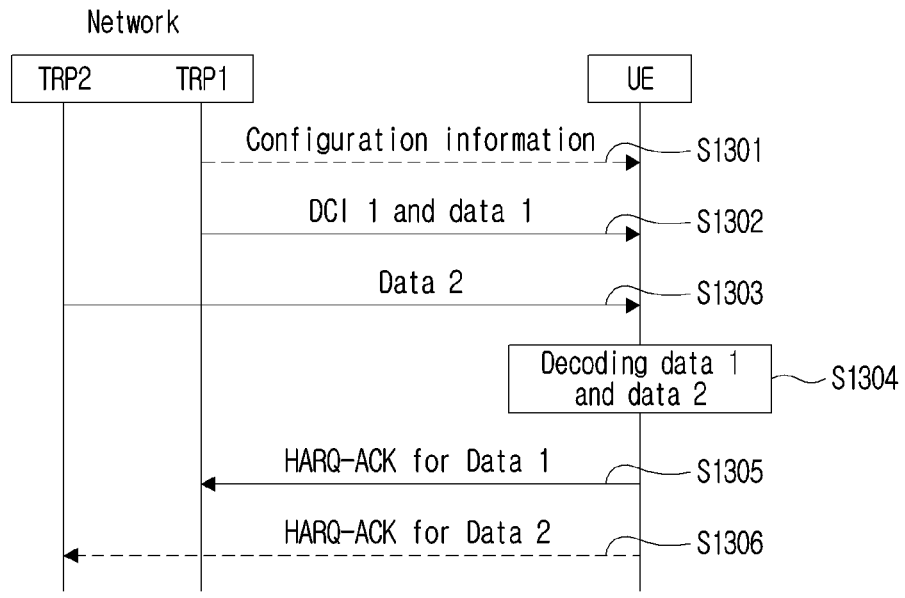

FIGS. 12 and 13 illustrate a signaling procedure between a network and a terminal for a method of transmitting and receiving downlink data according to an embodiment of the present disclosure.

The after-described FIGS. 12 and 13 illustrate signaling between a network (e.g., TRP 1, TRP 2) and a terminal (i.e., UE) in a situation of multiple TRPs (i.e., M-TRPs, or multiple cells, hereinafter, all TRPs may be replaced with a cell) that methods proposed in the present disclosure (e.g., proposal 1/proposal 2) may be applied.

Figure 16:
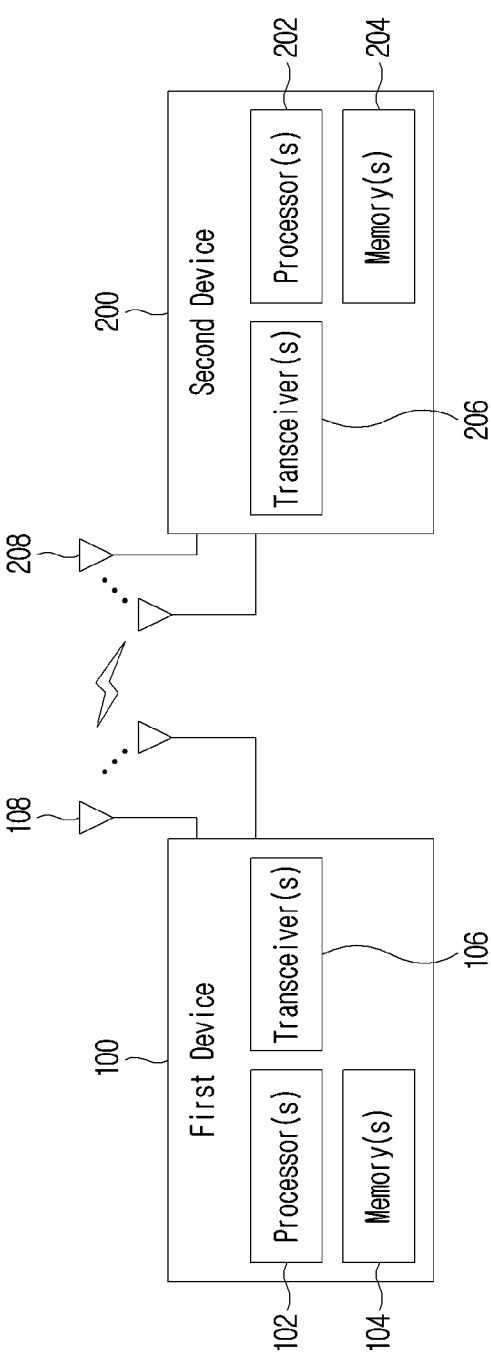
FIG. 16 illustrates a block diagram of a wireless communication system according to an embodiment of the present disclosure.

Here, UE/a network is just an example, and may be applied by being substituted with a variety of devices as described in the after-described FIG. 16. FIGS. 12 and 13 are just for convenience of a description, and do not limit a scope of the present disclosure. In addition, some step(s) shown in FIGS. 12 and 13 may be omitted according to a situation and/or a configuration, etc.

In reference to FIGS. 12 and 13, for convenience of a description, signaling between 2 TRPs and UE is considered, but a corresponding signaling method may be extended and applied to signaling between multiple TRPs and multiple UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be inversely interpreted/described.

In addition, as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an identifier (ID)). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal.

It is not shown in FIGS. 12 and 13, but a UE may transmit UE capability information to a Network through/with TRP 1 (and/or TRP 2). For example, the UE capability information may include information which represents whether a UE supports an operation of the above-described proposals (e.g., proposal 1/proposal 2, etc.).

Specifically, FIG. 12 represents signaling for a case in which a terminal receives multiple DCI (e.g., when each TRP transmits DCI to UE) in a situation of M-TRPs (or, a cell, hereinafter, all TRPs may be substituted with a cell, or even when a plurality of CORESETs are configured from one TRP, it may be assumed as M-TRPs).

In reference to FIG. 12, a UE may receive configuration information on Multiple TRP-based transmission and reception through/with TRP 1 (and/or TRP 2) from a Network S1201.

The configuration information may include information related to a configuration of a network (i.e., a TRP configuration), resource (resource allocation) information related to Multiple TRP-based transmission and reception, etc. Here, the configuration information may be transmitted through higher layer signaling (e.g., RRC signaling, MAC-CE, etc.). In addition, when the configuration information is predefined or preconfigured, a corresponding step may be omitted. For example, the configuration information may include a CORESET-related configuration/CCE configuration information/search space-related information/information related to repetitive transmission of a control channel (e.g., a PDCCH) (e.g., whether repetitive transmission is performed/the number of times of repetitive transmission, etc.) as described in the above-described proposal (e.g., proposal 1/proposal 2, etc.).

For example, the configuration information may include information for configuring an operation that a terminal reports HARQ-ACK information to a base station by using a HARQ-ACK codebook including a plurality of HARQ-ACK information, as described in the above-described proposal (e.g., proposal 1/proposal 2, etc.).

For example, the configuration information may include information on a TCI state pool for a MTRP PDCCH and a TCI state pool for a STRP PDCCH to differently define a TCI field for a MTRP PDCCH (e.g., when a PDCCH is repetitively/partitively transmitted at a plurality of monitoring occasions, a DMRS of each PDCCH candidate is associated with a different TCI state) and a TCI field for a STRP PDCCH (e.g., DCI is detected in a single PDCCH candidate and a single PDCCH candidate is associated with a single TCI state), respectively, as described in the above-described proposal (e.g., proposal 1/proposal 2, etc.).

In addition, a TCI state pool for a MTRP PDCCH and a STRP PDCCH may be commonly configured. In this case, configuration information may include information on a common TCI state pool. And, a TCI state candidate which may be indicated in a TCI state field in DCI of a MTRP PDCCH and a TCI state candidate which may be indicated in a TCI state field in DCI of a STRP PDCCH may be independently configured by a MAC CE in a common TCI state pool.

A UE may receive DCI 1 and data 1 scheduled by corresponding DCI 1 through/with TRP 1 from a Network S1202. In addition, UE may receive DCI 2 and data 2 scheduled by corresponding DCI 2 through/with TRP 2 from a Network S1203.

DCI (e.g., DCI 1, DCI 2) and Data (e.g., Data 1, Data 2) may be transmitted through a control channel (e.g., a PDCCH, etc.) and a data channel (e.g., a PDSCH, etc.), respectively. For example, the control channel (e.g., a PDCCH) may be repetitively transmitted or the same control channel may be partitively transmitted. In addition, Step S1202 and Step S1203 may be performed simultaneously or any one may be performed earlier than the other.

For example, DCI (e.g., DCI 1, DCI 2) may include (indication) information on a TCI state/resource allocation information on a DMRS and/or data (i.e., a space/frequency/time resource)/information related to repetitive transmission, etc. described in the above-described method (e.g., proposal 1/proposal 2, etc.). For example, the information related to repetitive transmission may include whether DCI is repetitively transmitted/the number of times of repetitions/whether one-time transmission is performed, etc.

For example, as described in the above-described proposal 2, a codepoint of a TCI field in the DCI may be differently defined respectively for a case in which DCI (e.g., DCI 1, DCI 2) is repetitively/partitively transmitted through a plurality of TRPs and a case in which it is transmitted through a single TRP. In other words, UE may differently apply/interpret a TCI state composition/configuration according to whether of a STRP/MTRPs for a specific codepoint. In other words, TCI state(s) indicated by a codepoint of a TCI state field in DCI may be differently configured according to whether of a STRP/MTRPs.

For example, TRP1 and/or TRP2 may repetitively/partitively transmit the same DCI. In other words, TRP1 and/or TRP2 may repetitively/partitively transmit DCI 1 and/or DCI 2. In one example, a PDCCH candidate for each TRP that the DCI is transmitted may correspond to a different TCI state. In other words, a control channel (e.g., a PDCCH) that DCI is transmitted may be repetitively transmitted based on a TDM/FDM/SDM method or the same control channel may be partitively transmitted. For example, a DCI format which may be transmitted per each TRP may be equally configured or differently configured, respectively.

For example, as described in the above-described proposal 1, when the DCI (or PDCCH) is repetitively/partitively transmitted at a plurality of monitoring occasions, parameter/indicator(s) (e.g., a C-DAI, a T-DAI, a PRI, a CCE index) related to a HARQ-ACK codebook including HARQ-ACK for a PDCCH scheduled by the DCI may be determined.

In addition, when a plurality of HARQ-ACK information is included in a single HARQ-ACK codebook (when it is multiplexed), HARQ-ACK-related parameter/indicator(s) associated with a HARQ-ACK codebook (e.g., a C-DAI, a T-DAI, a PRI, a CCE index) may be determined based on a reception occasion (i.e., a PDCCH monitoring occasion carrying DCI) of a plurality of DCI associated with a plurality of HARQ-ACK information. In other words, a HARQ-ACK codebook may be determined based on a reception occasion (i.e., a PDCCH monitoring occasion carrying DCI) of a plurality of DCI.

Here, when specific DCI associated with a HARQ-ACK codebook is repetitively/partitively transmitted at a plurality of PDCCH monitoring occasions, parameter/indicator(s) associated with a HARQ-ACK codebook may be determined as a specific monitoring occasion among a plurality of PDCCH monitoring occasions (e.g., the earliest monitoring occasion or the last monitoring occasion or the monitoring occasion configured by a base station).

Based on a reception order of multiple DCI associated with a HARQ-ACK codebook, a C-DAI value and/or a T-DAI value in the multiple DCI may be determined. Here, when specific DCI (or a PDCCH) associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a determined reception order, a C-DAI value and/or a T-DAI value in the multiple DCI may be determined.

In addition, based on a CCE index and a PRI of DCI received at a last monitoring occasion among multiple DCI associated with a HARQ-ACK codebook, a PUCCH resource that a HARQ-ACK codebook is transmitted may be determined. Here, as described above, when specific DCI (or a PDCCH) associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a CCE index and a PRI of the latest DCI based on a determined reception order, a PUCCH resource that a HARQ-ACK codebook is transmitted may be determined.

Multiple DCI associated with a HARQ-ACK codebook (or DCI which is repetitively/partitively transmitted at the plurality of monitoring occasions) may be transmitted in a different cell (or a carrier) to which carrier aggregation is applied.

If a plurality of DCI is transmitted at the same monitoring occasion, a reception order between the plurality of DCI may be determined based on a CCE index of the plurality of DCI (e.g., an ascending order or a descending order of a CCE index).

In addition, when specific DCI associated with a HARQ-ACK codebook is repetitively/partitively transmitted at a plurality of PDCCH monitoring occasions, a PDCCH-to-PDSCH offset may be applied from a specific monitoring occasion among a plurality of PDCCH monitoring occasions (e.g., the earliest or the last monitoring occasion).

A UE may decode received Data 1 and Data 2 through/with TRP 1 (and/or TRP 2) from a Network S1204. For example, UE may perform channel estimation and/or blind detection and/or data decoding based on the above-described method (e.g., proposal 1/proposal 2, etc.).

A UE may transmit HARQ-ACK information on the DCI and/or the Data 1 and/or Data 2 (e.g., ACK information, NACK information, etc.) to a Network through/with TRP 1 and/or TRP 2 S1205 and S1206. In this case, HARQ-ACK information on Data 1 and Data 2 may be combined (or multiplexed) into one. In addition, UE may be configured to transmit only HARQ-ACK information to a representative TRP (e.g., TRP 1) and HARQ-ACK information transmission to other TRP (e.g., TRP 2) may be omitted.

For example, HARQ-ACK information (e.g., ACK information, NACK information, etc.) on DCI (or a PDCCH that DCI is transmitted) may be transmitted to a Network through/with TRP 1 and/or TRP 2 based on the above-described proposals (e.g., proposal 1/proposal 2). For example, a parameter (e.g., a C-DAI, a T-DAI, a PRI, a CCE index) related to the HARQ-ACK information (e.g., an ACK/NACK codebook) may be determined according to a DCI reception occasion based on the above-described proposal (e.g., proposal 1/proposal 2). For example, when receiving a plurality of DCI including DCI which is repetitively transmitted, a reception order of the plurality of DCI may be determined based on a reception occasion (e.g., a MO) of the first DCI of DCI which is repetitively transmitted. A parameter (e.g., a C-DAI, a T-DAI, a PRI, a CCE index) related to the HARQ-ACK information (e.g., an ACK/NACK codebook) may be determined based on a DCI reception order determined for the plurality of DCI.

FIG. 13 represents signaling for a case in which a terminal receives single DCI (e.g., when one TRP transmits DCI to UE) in a situation of M-TRPs (or, a cell, hereinafter, all TRPs may be substituted with a cell, or even when a plurality of CORESETs are configured from one TRP, it may be assumed as M-TRPs). FIG. 13 assumes a case in which TRP 1 is a representative TRP which transmits DCI.

In reference to FIG. 13, UE may receive configuration information on Multiple TRP-based transmission and reception through/with TRP 1 (and/or TRP 2) from a Network S1301.

The configuration information may include information related to a configuration of a network (i.e., a TRP configuration), resource (resource allocation) information related to Multiple TRP-based transmission and reception, etc. Here, the configuration information may be transmitted through higher layer signaling (e.g., RRC signaling, a MAC-CE, etc.). In addition, when the configuration information is predefined or preconfigured, a corresponding step may be omitted. For example, the configuration information may include a CORESET-related configuration/CCE configuration information/search space-related information/information related to repetitive transmission of a control channel (e.g., a PDCCH) (e.g., whether repetitive transmission is performed/the number of times of repetitive transmission, etc.) as described in the above-described proposal (e.g., proposal 1/proposal 2, etc.).

For example, the configuration information may include information for configuring an operation that a terminal reports HARQ-ACK information to a base station by using a HARQ-ACK codebook including a plurality of HARQ-ACK information, as described in the above-described proposal (e.g., proposal 1/proposal 2, etc.).

For example, the configuration information may include information on a TCI state pool for a MTRP PDCCH and a TCI state pool for a STRP PDCCH to differently define a TCI field for a MTRP PDCCH (e.g., when a PDCCH is repetitively/partitively transmitted at a plurality of monitoring occasions, a DMRS of each PDCCH candidate is associated with a different TCI state) and a TCI field for a STRP PDCCH (e.g., DCI is detected in a single PDCCH candidate and a single PDCCH candidate is associated with a single TCI state), respectively, as described in the above-described proposal (e.g., proposal 1/proposal 2, etc.).

In addition, a TCI state pool for a MTRP PDCCH and a STRP PDCCH may be commonly configured. In this case, configuration information may include information on a common TCI state pool. And, a TCI state candidate which may be indicated in a TCI state field in DCI of a MTRP PDCCH and a TCI state candidate which may be indicated in a TCI state field in DCI of a STRP PDCCH may be independently configured by a MAC CE in a common TCI state pool.

A UE may receive DCI and Data 1 scheduled by corresponding DCI through/with TRP 1 from a Network S1302. In addition, UE may receive Data 2 through/with TRP 2 from a Network S1303. Here, DCI may be configured to be used for scheduling for both Data 1 and Data 2. In addition, DCI and Data (e.g., Data 1, Data 2) may be transmitted through a control channel (e.g., a PDCCH, etc.) and a data channel (e.g., a PDSCH, etc.), respectively.

For example, DCI may include (indication) information on a TCI state/resource allocation information on a DMRS and/or data (i.e., a space/frequency/time resource)/information related to repetitive transmission, etc. described in the above-described method (e.g., proposal 1/proposal 2, etc.). For example, the information related to repetitive transmission may include whether DCI is repetitively transmitted/the number of times of repetitions/whether one-time transmission is performed, etc.

For example, as described in the above-described proposal 2, a codepoint of a TCI field in the DCI may be differently defined respectively for a case in which DCI is repetitively/partitively transmitted through a plurality of TRPS and a case in which it is transmitted through a single TRP. In other words, UE may differently apply/interpret a TCI state composition/configuration according to whether of a STRP/MTRPs for a specific codepoint. In other words, TCI state(s) indicated by a codepoint of a TCI state field in DCI may be differently configured according to whether of a STRP/MTRPs.

For example, TRP1 and/or TRP2 may repetitively/partitively transmit the same DCI. In one example, a PDCCH candidate for each TRP that the DCI is transmitted may correspond to a different TCI state. In other words, a control channel (e.g., a PDCCH) that DCI is transmitted may be repetitively transmitted based on a TDM/FDM/SDM method or the same control channel may be partitively transmitted. For example, a DCI format which may be transmitted per each TRP may be equally configured or differently configured, respectively.

For example, as described in the above-described proposal 1, when the DCI (or a PDCCH) is repetitively/partitively transmitted at a plurality of monitoring occasions, parameter/indicator(s) (e.g., a C-DAI, a T-DAI, a PRI, a CCE index) related to a HARQ-ACK codebook including HARQ-ACK for a PDCCH scheduled by the DCI may be determined.

In addition, when a plurality of HARQ-ACK information is included in a single HARQ-ACK codebook (when it is multiplexed), HARQ-ACK-related parameter/indicator(s) associated with a HARQ-ACK codebook (e.g., a C-DAI, a T-DAI, a PRI, a CCE index) may be determined based on a reception occasion (i.e., a PDCCH monitoring occasion carrying DCI) of a plurality of DCI associated with a plurality of HARQ-ACK information. In other words, a HARQ-ACK codebook may be determined based on a reception occasion (i.e., a PDCCH monitoring occasion carrying DCI) of a plurality of DCI.

Here, when specific DCI associated with a HARQ-ACK codebook is repetitively/partitively transmitted at a plurality of PDCCH monitoring occasions, parameter/indicator(s) associated with a HARQ-ACK codebook may be determined as a specific monitoring occasion among a plurality of PDCCH monitoring occasions (e.g., the earliest monitoring occasion or the last monitoring occasion or the monitoring occasion configured by a base station).

Specifically, based on a reception order of multiple DCI associated with a HARQ-ACK codebook, a C-DAI value and/or a T-DAI value in the multiple DCI may be determined. Here, when specific DCI (or a PDCCH) associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions.

And, based on a determined reception order, a C-DAI value and/or a T-DAI value in the multiple DCI may be determined.

In addition, based on a CCE index and a PRI of DCI received at a last monitoring occasion among multiple DCI associated with a HARQ-ACK codebook, a PUCCH resource that a HARQ-ACK codebook is transmitted may be determined. Here, as described above, when specific DCI (or a PDCCH) associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a CCE index and a PRI of the latest DCI based on a determined reception order, a PUCCH resource that a HARQ-ACK codebook is transmitted may be determined.

Multiple DCI associated with a HARQ-ACK codebook (or DCI which is repetitively/partitively transmitted at the plurality of monitoring occasions) may be transmitted in a different cell (or a carrier) to which carrier aggregation is applied.

If a plurality of DCI is transmitted at the same monitoring occasion, a reception order of the plurality of DCI may be determined based on a CCE index of the plurality of DCI (e.g., an ascending order or a descending order of a CCE index).

In addition, when specific DCI associated with a HARQ-ACK codebook is repetitively/partitively transmitted at a plurality of PDCCH monitoring occasions, a PDCCH-to-PDSCH offset may be applied from a specific monitoring occasion among a plurality of PDCCH monitoring occasions (e.g., the earliest or the last monitoring occasion).

A UE may decode received Data 1 and Data 2 through/with TRP 1 (and/or TRP 2) from a Network S1304. For example, UE may perform channel estimation and/or blind detection and/or data decoding based on the above-described method (e.g., proposal 1/proposal 2, etc.).

A UE may transmit HARQ-ACK information on the DCI and/or the Data 1 and/or Data 2 (e.g., ACK information, NACK information, etc.) to a Network through/with TRP 1 and/or TRP 2 S1305 and S1306. In this case, HARQ-ACK information on Data 1 and Data 2 may be combined (or multiplexed) into one. In addition, UE may be configured to transmit only HARQ-ACK information to a representative TRP (e.g., TRP 1) and HARQ-ACK information transmission to other TRP (e.g., TRP 2) may be omitted.

For example, HARQ-ACK information (e.g., ACK information, NACK information, etc.) on DCI (or a PDCCH that DCI is transmitted) may be transmitted to a Network through/with TRP 1 and/or TRP 2 based on the above-described proposals (e.g., proposal 1/proposal 2). For example, a parameter (e.g., a C-DAI, a T-DAI, a PRI, a CCE index) related to the HARQ-ACK information (e.g., an ACK/NACK codebook) may be determined according to a DCI reception occasion based on the above-described proposal (e.g., proposal 1/proposal 2). For example, when receiving a plurality of DCI including DCI which is repetitively transmitted, a reception order of the plurality of DCI may be determined based on a reception occasion (e.g., a MO) of the first DCI of DCI which is repetitively transmitted. A parameter (e.g., a C-DAI, a T-DAI, a PRI, a CCE index) related to the HARQ-ACK information (e.g., an ACK/NACK codebook) may be determined based on a DCI reception order determined for the plurality of DCI.

As described above, the above-described Network/UE signaling and operation (e.g., proposal 1/proposal 2/FIGS.

12 and 13) may be implemented by a device (e.g., FIG. 16) which will be described below. For example, a Network (e.g., TRP 1/TRP 2) may correspond to a first wireless device and UE may correspond to a second wireless device and in some cases, the opposite may be considered.

For example, the above-described Network/UE signaling and operation (e.g., proposal 1/proposal 2/FIGS. 12 and 13) may be processed by one or more processors in FIG. 16 (e.g., 102, 202) and the above-described Network/UE signaling and operation (e.g., proposal 1/proposal 2/FIGS. 12 and 13) may be stored in a memory (e.g., one or more memories in FIG. 16 (e.g., 104, 204)) in a form of a command/a program (e.g., an instruction, an executable code) for driving at least one processor in FIG. 16 (e.g., 102, 202).

Figure 14:
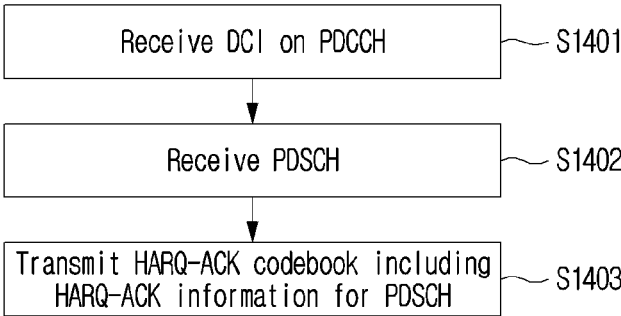
FIG. 14 illustrates an operation of a terminal for transmitting and receiving HARQ-ACK information according to an embodiment of the present disclosure.

FIG. 14 illustrates an operation of a terminal for transmitting and receiving HARQ-ACK information according to an embodiment of the present disclosure.

FIG. 14 illustrates an operation of a terminal based on the proposal 1/proposal 2. An example in FIG. 14 is for convenience of a description, and it does not limit a scope of the present disclosure. Some step(s) illustrated in FIG. 14 may be omitted according to a situation and/or a configuration. In addition, a terminal is just one example in FIG. 14, and may be implemented by a device illustrated in the following FIG. 16. For example, a processor 102/202 in FIG. 16 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 14 may be processed by one or more processors 102 and 202 in FIG. 16. In addition, an operation in FIG. 14 may be stored in a memory (e.g., one or more memories 104 and 204 in FIG. 16) in a form of a command/a program (e.g., an instruction, an executable code) for driving at least one processor in FIG. 16 (e.g., 102, 202).

A terminal receives DCI which schedules a PDSCH in a PDCCH from a base station S1401.

DCI (or a PDCCH) may be repetitively/partitively received at a plurality of PDCCH monitoring occasions. Here, the DCI may be repetitively/partitively transmitted from a plurality of TRPs and may be repetitively transmitted from a single TRP.

As described in the above-described proposal 2, a codepoint of a TCI field in the DCI may be differently defined for a case in which DCI is repetitively/partitively transmitted through a plurality of TRPs (e.g., when a PDCCH is repetitively/partitively transmitted at a plurality of monitoring occasions, a DMRS of each PDCCH candidate is associated with a different TCI state) and a case in which it is transmitted through a single TRP (e.g., DCI is detected in a single PDCCH candidate and a single PDCCH candidate is associated with a single TCI state). In other words, UE may differently apply/interpret a TCI state composition/configuration according to whether of a STRP/MTRPs for a specific codepoint. In other words, TCI state(s) indicated by a codepoint of a TCI state field in DCI may be differently configured according to whether of a STRP/MTRPs.

A terminal receives a PDSCH from a base station S1402.

A terminal transmits a HARQ-ACK codebook including HARQ-ACK information on a PDSCH to a base station S1403.

As described in the above-described proposal 1, parameter/indicator(s) related to the HARQ-ACK codebook (e.g., a C-DAI, a T-DAI, a PRI, a CCE index) may be determined based on the earliest MO among the plurality of MOs.

In addition, when a plurality of HARQ-ACK information is included in a single HARQ-ACK codebook (when it is multiplexed), HARQ-ACK-related parameter/indicator(s) associated with a HARQ-ACK codebook (e.g., a C-DAI, a T-DAI, a PRI, a CCE index) may be determined based on a reception occasion (i.e., a PDCCH monitoring occasion carrying DCI) of a plurality of DCI associated with a plurality of HARQ-ACK information.

Here, when specific DCI of multiple DCI associated with a HARQ-ACK codebook is repetitively/partitively transmitted at a plurality of PDCCH monitoring occasions, parameter/indicator(s) associated with a HARQ-ACK codebook may be determined as a specific monitoring occasion among a plurality of PDCCH monitoring occasions (e.g., the earliest monitoring occasion or the last monitoring occasion or the monitoring occasion configured by a base station).

In other words, when the DCI is repetitively/partitively transmitted at a plurality of PDCCH monitoring occasions, a PDCCH monitoring occasion (i.e., a DCI reception occasion) may be determined as the earliest monitoring occasion among a plurality of PDCCH monitoring occasions (or the last monitoring occasion or the monitoring occasion configured by a base station).

Specifically, based on a reception order of multiple DCI associated with a HARQ-ACK codebook, a C-DAI value and/or a T-DAI value in the multiple DCI may be determined. Here, when specific DCI (or a PDCCH) of multiple DCI associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a determined reception order, a C-DAI value and/or a T-DAI value in the multiple DCI may be determined.

In addition, based on a CCE index and a PRI of DCI received at the last monitoring occasion among multiple DCI associated with a HARQ-ACK codebook, a PUCCH resource that a HARQ-ACK codebook is transmitted may be determined. Here, as described above, when specific DCI (or a PDCCH) of multiple DCI associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a PRI and a CCE index of latest DCI based on a determined reception order, a PUCCH resource that a HARQ-ACK codebook is transmitted may be determined. In other words, when a PUCCH resource indication of DCI which is recently received is used to determine a PUCCH resource that a HARQ-ACK codebook is transmitted, DCI which is recently received may be determined based on the earliest monitoring occasion of DCI which is repetitively/partitively transmitted at a plurality of monitoring occasions.

Multiple DCI associated with a HARQ-ACK codebook (or DCI which is repetitively/partitively transmitted at the plurality of monitoring occasions) may be transmitted in a different cell (or a carrier) to which carrier aggregation is applied.

If a plurality of DCI is transmitted at the same monitoring occasion, a reception order of the plurality of DCI may be determined based on a CCE index of the plurality of DCI (e.g., an ascending order or a descending order of a CCE index). As described above, when specific DCI (or a PDCCH) of multiple DCI associated with a HARQ-ACK codebook is repetitively/partitively transmitted at a plurality of monitoring occasions, a reception order of the multiple DCI may be determined based on the earliest monitoring occasion among a plurality of monitoring occasions. Here, when different DCI is received together at the earliest monitoring occasion, a reception order may be determined based on a CCE index between DCI transmitted at the same monitoring occasion.

In addition, when specific DCI associated with a HARQ-ACK codebook is repetitively/partitively transmitted at a plurality of PDCCH monitoring occasions, a PDCCH-to-PDSCH offset may be applied from a specific monitoring occasion among a plurality of PDCCH monitoring occasions (e.g., the earliest or the last monitoring occasion).

Figure 15:
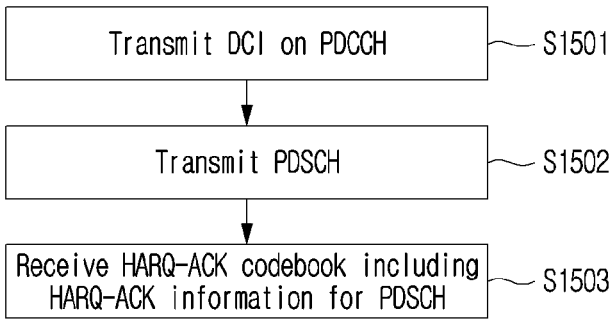
FIG. 15 illustrates an operation of a base station for transmitting and receiving HARQ-ACK information according to an embodiment of the present disclosure.

FIG. 15 illustrates an operation of a base station for transmitting and receiving HARQ-ACK information according to an embodiment of the present disclosure.

FIG. 15 illustrates an operation of a base station based on the proposal 1/proposal 2. An example in FIG. 15 is for convenience of a description, and it does not limit a scope of the present disclosure. Some step(s) illustrated in FIG. 15 may be omitted according to a situation and/or a configuration. In addition, a base station is just one example in FIG. 14, and may be implemented by a device illustrated in the following FIG. 16. For example, a processor 102/202 in FIG. 16 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 15 may be processed by one or more processors 102 and 202 in FIG. 16. In addition, an operation in FIG. 15 may be stored in a memory (e.g., one or more memories 104 and 204 in FIG. 16) in a form of a command/a program (e.g., an instruction, an executable code) for driving at least one processor in FIG. 16 (e.g., 102, 202).

A base station transmits DCI which schedules a PDSCH in a PDCCH to a terminal S1501.

DCI (or a PDCCH) may be repetitively/partitively transmitted at a plurality of PDCCH monitoring occasions. Here, the DCI may be repetitively/partitively transmitted from a plurality of TRPs and may be repetitively transmitted from a single TRP.

As described in the above-described proposal 2, a code-point of a TCI field in the DCI may be differently defined for a case in which DCI is repetitively/partitively transmitted through a plurality of TRPs (e.g., when a PDCCH is repetitively/partitively transmitted at a plurality of monitoring occasions, a DMRS of each PDCCH candidate is associated with a different TCI state) and a case in which it is transmitted through a single TRP (e.g., DCI is detected in a single PDCCH candidate and a single PDCCH candidate is associated with a single TCI state). In other words, UE may differently apply/interpret a TCI state composition/configuration according to whether of a STRP/MTRPs for a specific codepoint. In other words, TCI state(s) indicated by a codepoint of a TCI state field in DCI may be differently configured according to whether of a STRP/MTRPs.

A base station transmits a PDSCH to a terminal S1502.

A base station receives a HARQ-ACK codebook including HARQ-ACK information on a PDSCH from a terminal S1503.

As described in the above-described proposal 1, parameter/indicator(s) related to the HARQ-ACK codebook (e.g., a C-DAI, a T-DAI, a PRI, a CCE index) may be determined based on the earliest MO among the plurality of MOs.

In addition, when a plurality of HARQ-ACK information is included in a single HARQ-ACK codebook (when it is multiplexed), HARQ-ACK-related parameter/indicator(s) associated with a HARQ-ACK codebook (e.g., a C-DAI, a T-DAI, a PRI, a CCE index) may be determined based on a transmission/reception occasion of a plurality of DCI (i.e., a PDCCH monitoring occasion carrying DCI) associated with a plurality of HARQ-ACK information.

Here, when specific DCI of multiple DCI associated with a HARQ-ACK codebook is repetitively/partitively transmitted at a plurality of PDCCH monitoring occasions, parameter/indicator(s) associated with a HARQ-ACK codebook may be determined as a specific monitoring occasion among a plurality of PDCCH monitoring occasions (e.g., the earliest monitoring occasion or the last monitoring occasion or the monitoring occasion configured by a base station).

In other words, when the DCI is repetitively/partitively transmitted at a plurality of PDCCH monitoring occasions, a PDCCH monitoring occasion (i.e., a DCI transmission/reception occasion) may be determined as the earliest monitoring occasion among a plurality of PDCCH monitoring occasions (or the last monitoring occasion or the monitoring occasion configured by a base station).

Specifically, based on a transmission/reception order of multiple DCI associated with a HARQ-ACK codebook, a C-DAI value and/or a T-DAI value in the multiple DCI may be determined. Here, when specific DCI (or a PDCCH) of multiple DCI associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a determined reception order, a C-DAI value and/or a T-DAI value in the multiple DCI may be determined.

In addition, based on a CCE index and a PRI of DCI transmitted/received at the last monitoring occasion among multiple DCI associated with a HARQ-ACK codebook, a PUCCH resource that a HARQ-ACK codebook is transmitted may be determined. Here, as described above, when specific DCI (or a PDCCH) of multiple DCI associated with a HARQ-ACK codebook is repetitively/partitively transmitted at a plurality of monitoring occasions, a reception order of multiple DCI associated with the HARQ-ACK codebook may be determined based on the earliest monitoring occasion among a plurality of monitoring occasions. And, based on a CCE index and a PRI of latest DCI based on a determined reception order, a PUCCH resource that a HARQ-ACK codebook is transmitted may be determined. In other words, when a PUCCH resource indication of DCI which is recently received is used to determine a PUCCH resource that a HARQ-ACK codebook is transmitted, DCI which is recently received may be determined based on the earliest monitoring occasion of DCI which is repetitively/partitively transmitted at a plurality of monitoring occasions.

Multiple DCI associated with a HARQ-ACK codebook (or DCI which is repetitively/partitively transmitted at the plurality of monitoring occasions) may be transmitted in a different cell (or a carrier) to which carrier aggregation is applied.

If a plurality of DCI is transmitted at the same monitoring occasion, a transmission/reception order of the plurality of DCI may be determined based on a CCE index of the plurality of DCI (e.g., an ascending order or a descending order of a CCE index). As described above, when specific DCI (or a PDCCH) of multiple DCI associated with a HARQ-ACK codebook is repetitively/partitively transmitted at a plurality of monitoring occasions, a reception order of the multiple DCI may be determined based on the earliest monitoring occasion among a plurality of monitoring occasions. Here, when different DCI is received together at the earliest monitoring occasion, a reception order may be determined based on a CCE index between DCI transmitted at the same monitoring occasion.

In addition, when specific DCI associated with a HARQ-ACK codebook is repetitively/partitively transmitted at a plurality of PDCCH monitoring occasions, a PDCCH-to-PDSCH offset may be applied from a specific monitoring occasion among a plurality of PDCCH monitoring occasions (e.g., the earliest or the last monitoring occasion).

General Device to which the Present Disclosure May be Applied

FIG. 16 is a diagram which illustrates a block diagram of a wireless communication device according to an embodiment of the present disclosure.

In reference to FIG. 16, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal, from a base station, downlink control information (DCI) formats scheduling a plurality of PDSCHs (physical downlink shared channels) in a plurality of PDCCH (physical downlink control channel) monitoring occasions (MOS), wherein each of the DCI formats includes a counter downlink assignment index (C-DAI);
receiving, by the terminal, from the base station, the plurality of PDSCHs; and
transmitting, by the terminal, to the base station, a HARQ (Hybrid-Automatic Repeat and request)-ACK (Acknowledgement) codebook including HARQ-ACK information for the plurality of PDSCHs,
wherein, based on a first DCI format among the DCI formats being repetitively transmitted in two or more PDCCH MOs among the plurality of PDCCH MOs, the earliest MO of the first DCI format is determined as a reception occasion for the two or more PDCCH MOs,
wherein a reception order of the plurality of PDCCH MOs is determined based on the reception occasion, and
wherein a value of the C-DAI in each of the DCI formats is determined based on the reception order of the plurality of PDCCH MOs.

2. The method of claim 1, wherein and/or a total DAI (T-DAI) related to the HARQ-ACK codebook are determined based on the earliest MO.

3. The method of claim 1, wherein, based on a PUCCH resource indication (PRI) of the most recently received DCI being used to determine a PUCCH (physical uplink control channel) resource that the HARQ-ACK codebook is transmitted, the most recently received DCI format for the DCI formats is determined based on the reception order of the plurality of PDCCH MOs.

4. The method of claim 3, wherein based on a second DCI format being received together at the earliest MO, the most recently received DCI format is determined based on a control channel element (CCE) index of the DCI formats.

5. The method of claim 1, wherein an offset between a PDCCH of the first DCI format and a PDSCH scheduled by the first DCI format is applied based on the latest MO of the two or more of MOs.

6. The method of claim 1, wherein the first DCI format is repetitively transmitted in multiple serving cells to which a carrier aggregation (CA) is applied.

7. The method of claim 1, wherein a demodulation reference signal (DMRS) of each PDCCH candidate in the two or more of MOs is associated with a different transmission configuration indication (TCI) state.

8. The method of claim 7, wherein a TCI state indicated by a codepoint of a TCI state field of the first DCI is configured differently from a third DCI format detected in a single PDCCH candidate.

9. The method of claim 8, wherein a TCI state pool for a TCI state field of the first DCI format and a TCI state pool for a TCI state field of the third DCI format detected are independently configured.

10. The method of claim 8, wherein and a TCI state pool for a TCI state field of the first DCI format and a TCI field of the third DCI format is common,
wherein a TCI state candidate for a TCI state field of the first DCI format and a TCI state candidate for a TCI state field of the third DCI format are independently configured by a medium access control (MAC) control element (CE).

11. A terminal comprising:
at least one transceiver for transmitting and receiving a wireless signal; and
at least one processor which control the at least one transceiver,
the at least one processor configured to:
receive, from a base station, downlink control information (DCI) formats scheduling a plurality of PDSCHs (physical downlink shared channels) in a plurality of PDCCH (physical downlink control channel) monitoring occasions (MOs), wherein each of the DCI formats includes a counter downlink assignment index (C-DAI);
receive, from the base station, the plurality of PDSCHs; and
transmit, to the base station, a HARQ (Hybrid-Automatic Repeat and request)-ACK (Acknowledgement) codebook including HARQ-ACK information for the plurality of PDSCHs,
wherein, based on a first DCI format among the DCI formats being repetitively transmitted in two or more PDCCH MOs among the plurality of PDCCH MOs, the earliest MO of the first DCI format is determined as a reception occasion for two or more PDCCH MOs,
wherein a reception order of the plurality of PDCCH MOs is determined based on the reception occasion, and
wherein a value of the C-DAI in each of the DCI formats is determined based on the reception order of the plurality of PDCCH MOs.

12. A method comprising:
transmitting, by a base station, to a terminal, downlink control information (DCI) formats scheduling a plurality of PDSCHs (physical downlink shared channels) in a plurality of PDCCH (physical downlink control channel) monitoring occasions (MOs), wherein each of the DCI formats includes a counter downlink assignment index (C-DAI);
transmitting, by the base station, to the terminal, the plurality of PDSCHs; and
receiving, by the base station, from the terminal, a HARQ (Hybrid-Automatic Repeat and request)-ACK (Acknowledgement) codebook including HARQ-ACK information for the plurality of PDSCHs,
wherein, based on a first DCI format among the DCI formats being repetitively transmitted in two or more PDCCH MOs among the plurality of PDCCH MOs, the earliest MO of the first DCI format is determined as a reception occasion for the two or more PDCCH MOs,

wherein a reception order of the plurality of PDCCH MOs is determined based on the reception occasion, and wherein a value of the C-DAI in each of the DCI formats is determined based on the reception order of the plurality of PDCCH MOs.

13. A base station comprising:

at least one transceiver for transmitting and receiving a wireless signal; and at least one processor which control the at least one transceiver, the at least one processor configured to:

transmit, to a terminal, downlink control information (DCI) formats scheduling a plurality of PDSCHs (physical downlink shared channels) in a plurality of PDCCH (physical downlink control channel) monitoring occasions (MOs), wherein each of the DCI formats includes a counter downlink assignment index (C-DAI);

transmit, to the terminal, the plurality of PDSCHs; and receive, from the terminal, a HARQ (Hybrid-Automatic Repeat and request)-ACK (Acknowledgement) codebook including HARQ-ACK information for the plurality of PDSCHs, wherein based on a first DCI format among the DCI formats being repetitively transmitted in two or more PDCCH MOs among the plurality of PDCCH MOs, the earliest MO of the first DCI format is determined as a reception occasion for for the two or more PDCCH MOs, wherein a reception order of the plurality of PDCCH MOs is determined based on the reception occasion, and wherein a value of the C-DAI in each of the DCI formats is determined based on the reception order of the plurality of PDCCH MOS.

* * * * *